United States Patent
Ogura

(10) Patent No.: US 11,190,051 B2
(45) Date of Patent: Nov. 30, 2021

(54) APPARATUS, SYSTEM AND METHOD

(71) Applicant: KABUSHIKI KAISHA TOSHIBA, Tokyo (JP)

(72) Inventor: Koji Ogura, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 16/540,182

(22) Filed: Aug. 14, 2019

(65) Prior Publication Data
US 2020/0295603 A1   Sep. 17, 2020

(30) Foreign Application Priority Data

Mar. 15, 2019  (JP) ............................. JP2019-049012

(51) Int. Cl.
| H02J 50/12 | (2016.01) |
| H02J 7/02 | (2016.01) |
| H02M 7/5387 | (2007.01) |
| H02J 50/80 | (2016.01) |
| H02M 7/06 | (2006.01) |

(52) U.S. Cl.
CPC ............... H02J 50/12 (2016.02); H02J 7/025 (2013.01); H02M 7/5387 (2013.01); *H02J 50/80* (2016.02); *H02M 7/06* (2013.01)

(58) Field of Classification Search
USPC ........................................................ 307/104
See application file for complete search history.

(56) References Cited

U.S. PATENT DOCUMENTS

| 9,001,881 B2 | 4/2015 | Okamura et al. |
| 10,348,133 B2 | 7/2019 | Miyamoto et al. |
| 2012/0032521 A1 | 2/2012 | Inoue et al. |
| 2018/0241301 A1* | 8/2018 | Nagaoka ................. H02J 7/025 |
| 2018/0269717 A1 | 9/2018 | Shijo et al. |

(Continued)

FOREIGN PATENT DOCUMENTS

| JP | H11154880 | * | 6/1999 |
| JP | 2010193598 A | | 9/2010 |

(Continued)

OTHER PUBLICATIONS

U.S. Appl. No. 16/129,086; First Named Inventor: Koji Ogura; Title: "Electric Power Transmission Device and Electric Power Transmission System"; Filed: Sep. 12, 2018.

(Continued)

*Primary Examiner* — Toan T Vu
*Assistant Examiner* — Xuan Ly
(74) *Attorney, Agent, or Firm* — Holtz, Holtz & Volek PC

(57) ABSTRACT

According to one embodiment, an apparatus includes a transmitter, a sensor, a controller and an adjustment circuit. The transmitter is configured to transmit a power signal wirelessly. The sensor is configured to measure a value of the power signal. The controller is configured to: determine a frequency characteristic of the power signal based on the value measured by the sensor; and switch a frequency of the power signal between a plurality of frequencies. The adjustment circuit is configured to adjust an amplitude of the power signal based on a change of the frequency characteristic of the provided power signal by switching the frequency of the power signal.

16 Claims, 20 Drawing Sheets

(56) References Cited

U.S. PATENT DOCUMENTS

| | | |
|---|---|---|
| 2019/0006843 A1 | 1/2019 | Suzuki et al. |
| 2019/0288541 A1 | 9/2019 | Ogura |
| 2019/0288568 A1 | 9/2019 | Ogura et al. |
| 2020/0021146 A1 | 1/2020 | Ogura |
| 2020/0083719 A1 | 3/2020 | Suzuki et al. |

FOREIGN PATENT DOCUMENTS

| | | |
|---|---|---|
| JP | 2015033316 A | 2/2015 |
| JP | 5891387 B2 | 3/2016 |
| JP | 2018117511 A | 7/2018 |
| JP | 2018157614 A | 10/2018 |
| JP | 2019017134 A | 1/2019 |
| JP | 2019161860 A | 9/2019 |
| JP | 2019161866 A | 9/2019 |
| JP | 2020010578 A | 1/2020 |
| JP | 2020043682 A | 3/2020 |

OTHER PUBLICATIONS

U.S. Appl. No. 16/127,854; First Named Inventor: Koji Ogura; Title: "Electric Power Transmission Device and Electric Power Transmission System"; Filed:Sep. 11, 2018.
Kim, et al., "EMI Reduction in Wireless Power Transfer System Using Spread Spectrum Frequency Dithering", IEEE Wireless Power Transfer Conference, 2016.
U.S. Appl. No. 16/292,372.
U.S. Appl. No. 16/292,550.

* cited by examiner

APPARATUS, SYSTEM AND METHOD

CROSS-REFERENCE TO RELATED APPLICATIONS

This application is based upon and claims the benefit of priority from Japanese Patent Application No. 2019-049012, filed on Mar. 15, 2019; the entire contents of which are incorporated herein by reference.

FIELD

Embodiments described herein relate generally to an apparatus, a system and a method.

BACKGROUND

Today, non-contact power transmission technology is used to provide power to electric vehicles (EVs) with batteries. To charge large-capacity batteries within a short period, systems capable of transmitting high powers are required. By increasing the current flowing within the elements for transmitting power and receiving power, non-contact power transmission of large amounts of powers become possible. However, in such cases, the leakage electromagnetic field strength may exceed negligible levels, affecting operation of various devices within the environment and safety to the human body. Thus, the leakage electromagnetic field strength should be kept within the levels defined in radio wave regulations and radio wave protection guidelines.

One method of reducing the leakage electromagnetic field strength is by switching the frequency of supplied power signals between a plurality of frequencies. However, the switching of frequencies generates ripples within the power signals. Development of technology which reduces ripples by simple controlling methods, not requiring the use of large-scale circuits is desired.

DETAILED DESCRIPTION

Figure 1:
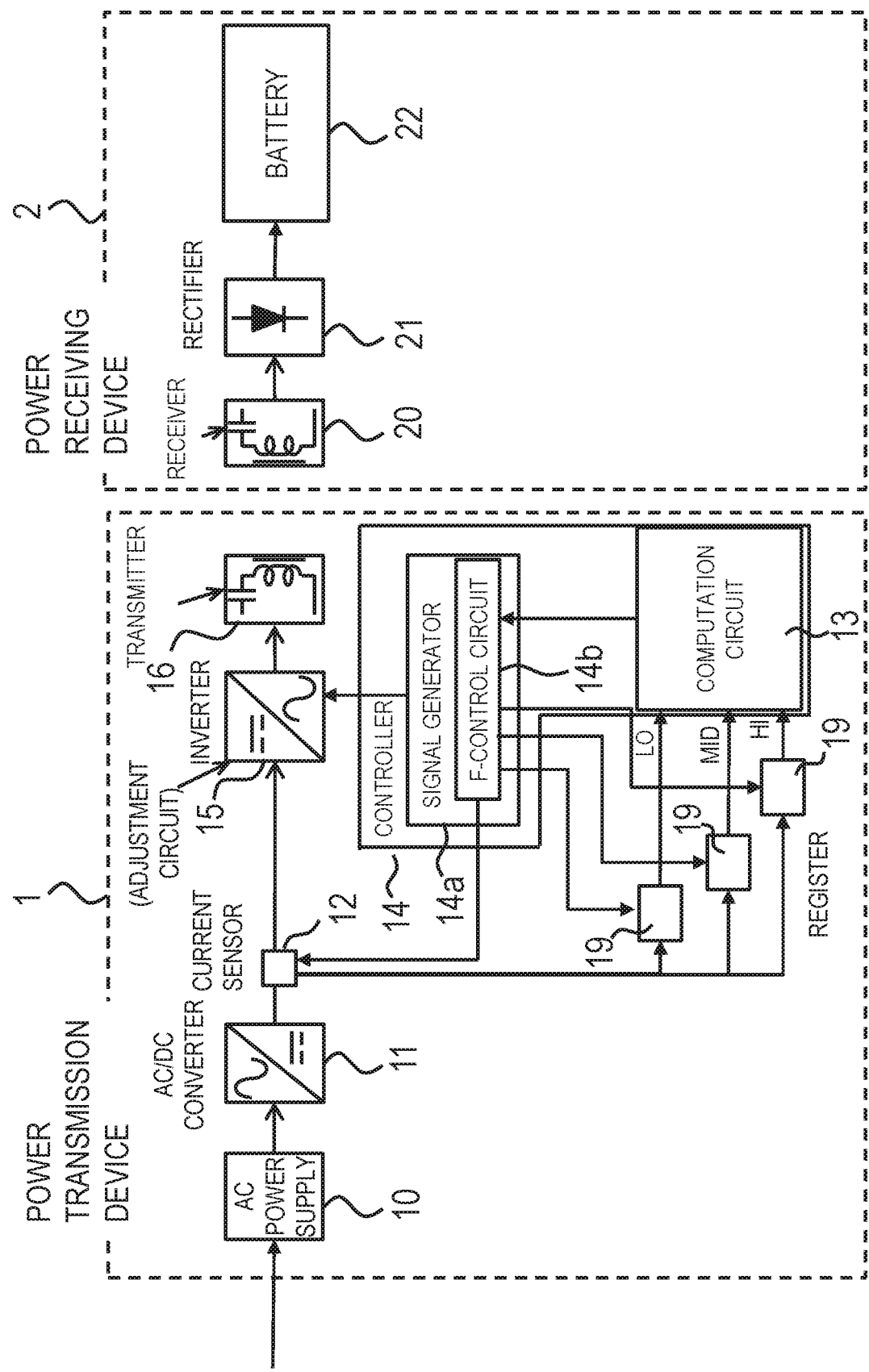
FIG. 1 is a block diagram illustrating an example of a non-contact power transmission system according to a first embodiment.

According to one embodiment, an apparatus includes a transmitter, a sensor, a controller and an adjustment circuit. The transmitter is configured to transmit a power signal wirelessly. The sensor is configured to measure a value of the power signal. The controller is configured to: determine a frequency characteristic of the power signal based on the value measured by the sensor; and switch a frequency of the power signal between a plurality of frequencies. The adjustment circuit is configured to adjust an amplitude of the power signal based on a change of the frequency characteristic of the provided power signal by switching the frequency of the power signal.

In the following detailed description, for purposes of explanation, numerous specific details are set forth in order to provide a thorough understanding of the embodiments. It will be apparent, however, that one or more embodiments may be practiced without these specific details. In other instances, well-known structures and devices are schematically shown in order to simplify the drawing.

Hereinafter, embodiments of the present invention will be described with reference to the drawings.

First Embodiment

FIG. 1 is a block diagram illustrating an example of a non-contact power transmission system according to a first embodiment. The power transmission device 1 (apparatus or a non-contact power transmission device) in FIG. 1 includes an AC power supply 10, a AC/DC converter 11, a current sensor 12, a controller 14, an inverter 15 and a transmitter (power transmission circuit) 16. The controller 14 is configured to: determine a frequency characteristic of the power signal based on the value measured by the sensor; and switch a frequency of the power signal between a plurality of frequencies. The controller 14 includes a signal generator 14a, a frequency control circuit 14b (f-control circuit in the figures) and computation circuit 13, as internal components. The AC power supply 10 provides an AC current to the AC/DC converter 11. Elements such as a power factor correction circuit and a rectifier can be connected to the AC power supply 10. The AC/DC converter 11 converts the AC current to a DC current. Also, the AC/DC converter 11 controls the voltage or the current of the power signal provided to the inverter 15. Thereby, the power transmitted by the power transmission device 1 can be controlled. The current sensor 12 is an example of a sensor configured to measure a value of the power signal. The computation circuit 13 is configured to calculate a frequency characteristic of the power signal based on a value measured by the sensor.

The adjustment circuit configured to adjust an amplitude of the power signal based on a change of the frequency characteristic of the provided power signal by switching the frequency of the power signal. The adjustment circuit can be configured to adjust the amplitude of the power signal to cancel effects from the frequency characteristic. The adjustment circuit can be configured to adjust the amplitude of the power signal to cancel the change of the frequency characteristic of the provided power signal provided by switching the frequency of the power signal. The inverter 15 is an example of the adjustment circuit. For example, the adjustment circuit can be configured to adjust an amplitude of the power signal based on a phase difference of legs in the inverter 15. The controller 14 can be configured to change a phase difference of legs in the inverter 15 to adjust the amplitude of the power signal.

For example, the inverter 15 is a circuit which includes switching elements. When a DC current is provided to the inverter 15, the inverter converts the DC current to an AC current with specific frequencies. The inverter 15 controls the switching elements based on a signal (hereinafter referred to as a driving signal) provided from the signal generator 14a, to convert the power signal. For example, the driving signal may include square waves of a specific duty ratio, a dead time or a frequency. The inverter 15 is an example of an adjustment circuit which adjusts the amplitude of the power signal based on a configured value. The configured value of the adjustment circuit can be changed by using different duty ratios, dead times and/or frequencies for the driving signal.

The controller 14 is configured to switch a frequency of the power signal between a plurality of frequencies. The frequency control circuit 14b of the controller 14 switches the frequency of the power signal provided from the inverter 15, between a plurality of frequencies distributed within a certain frequency band. Thus, the frequency control circuit 14b enables the frequency hopping of the supplied power signal. Hereinafter, the power signal provided from the inverter 15 to the transmitter 16 is referred to as the supplied power signal.

The transmitter 16 is configured to transmit a power signal wirelessly. For example, the transmitter 16 includes a power transmission coil and a capacitor. The capacitor is connected between the inverter 15 and the power transmission coil, forming a compensation circuit. The compensation circuit reduces the phase difference between the current and the voltage of the AC signal provided to the power transmission coil, improving the power factor. As illustrated in FIG. 1, the capacitor can be connected to the power transmission coil in series. Also, the capacitor of the transmitter 16 can be connected to the power transmission in parallel.

In FIG. 1, the inverter 15 and the power transmission coil are connected via the capacitor. However, a filter circuit can be connected between the inverter 15 and the power transmission coil. By using the filter circuit, the high-order leakage electromagnetic field can be reduced.

The power receiving device 2 includes a receiver (power receiving circuit) 20, a rectifier 21 and a battery 22. The receiver 20 includes a power receiving coil and a capacitor. The power receiving coil of the power receiving device 2 can be coupled electromagnetically to the power transmission coil of the power transmission device 1. Thereby, non-contact transmission of power between the devices is executed. Examples of electromagnetic coupling include electromagnetic induction and magnetic field resonance. However, the type of electromagnetic coupling used for transmission of power is not limited. The capacitor of the receiver 20 can be connected to the power receiving coil in series. Also, the capacitor of the receiver 20 can be connected to the power receiving coil in parallel. The AC current provided from the receiver is converted to a DC current by the rectifier 21. Then, the DC current is provided to the battery 22. For example, the battery 22 is a secondary battery which can be charged and discharged. Examples of the secondary battery include lithium ion batteries and nickel-metal hydride batteries. However, the type of secondary battery is not limited. Also, the battery 22 can be a combination of a plurality of secondary batteries. In this case, the connection between the plurality of secondary batteries is not limited.

In the non-contact power transmission system of FIG. 1, coils were used as the element for transmitting power and receiving power. However, the type of the elements used for transmitting power and receiving power is not limited. For example, the elements can be electrodes or antennas. In this case, the electric field generated by the electrode or the antenna enables non-contact transmission of power.

The magnetic field generated by the power transmission device 1 is used for supplying power to the power receiving device 2. However, part of the generated magnetic field becomes the leakage electromagnetic field, which may interfere with electronic devices within the environment. The accepted values of the leakage electromagnetic field strength may be defined in laws or guidelines, depending on the region. To prevent interference to electronic devices, the leakage electromagnetic field strength can be kept within the range of the accepted values. Generally, electric vehicles including buses and trucks have large-capacity batteries. To charge the large-capacity batteries within a short period, non-contact power transmission systems capable of transmitting large amounts of power are required. Since the leakage electromagnetic field strength is proportional to the amount of transmitted power, technology which reduces the leakage electromagnetic field is desired.

The non-contact power transmission system according to the embodiment executes frequency hopping of the supplied power signal. Thus, the power of the transmitted signal is scattered across a specific frequency band. The inverter 15 generates a supplied power signal with a frequency specified by the frequency control circuit 14b. For example, the inverter 15 can switch the frequency of the supplied power signal according to a specific pattern.

Figure 2:
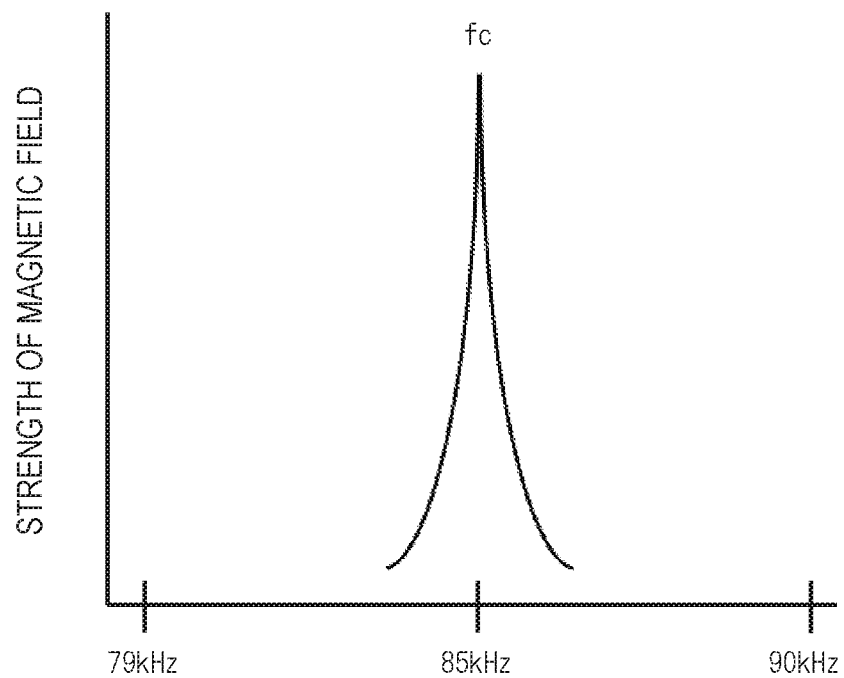
FIG. 2 is a diagram illustrating an example of spectral strength of magnetic field when a single frequency is used in a supplied power signal.

FIG. 2 is a diagram illustrating an example of spectral strength of magnetic field when a single frequency is used in a supplied power signal. The horizontal axis of FIG. 2 represents the frequency. The vertical axis of FIG. 2 represents the magnetic field strength. In the graph of FIG. 2, 85 kHz (79-90 kHz) frequency band is used for non-contact transmission of power. A peak of magnetic field strength is observable in $f_c$=85 kHz, referring to the spectrum. The 85 kHz frequency band is the candidate frequency band which may be adopted in the standards for non-contact power transmission to electric vehicles.

Figure 3:
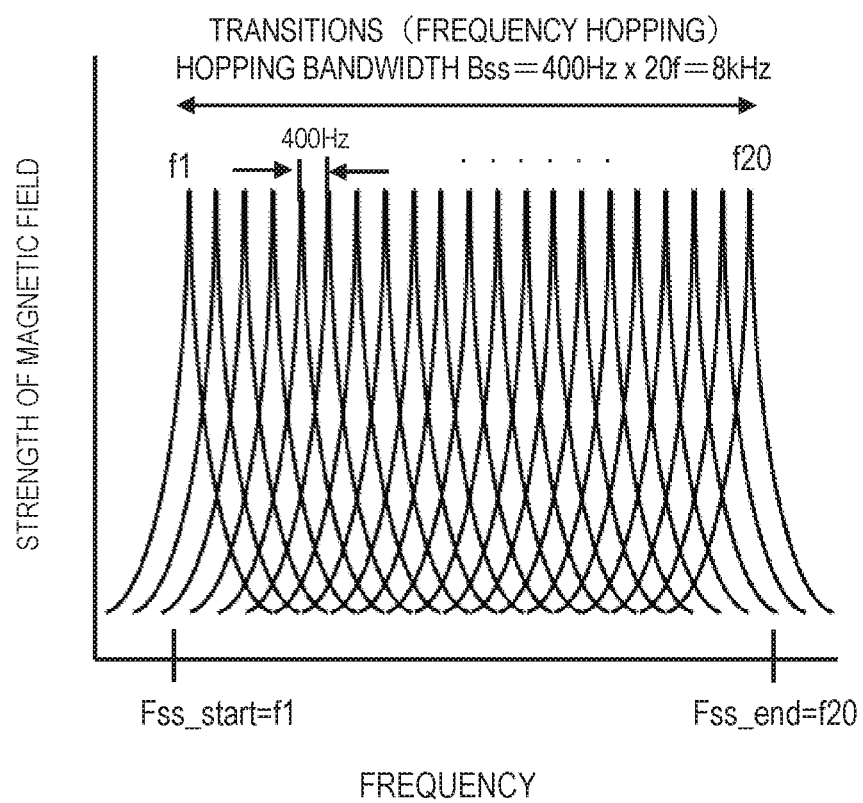
FIG. 3 is a diagram illustrating an example of spectral strength of magnetic field when a plurality of frequencies is used in the supplied power signals.

FIG. 3 is a diagram illustrating an example of spectral strength of magnetic field when a plurality of frequencies is used in the supplied power signals. The horizontal axis of FIG. represents the frequency. The vertical axis of FIG. 3 represents the magnetic field strength. In the supplied power signal, either of the frequencies f1 to f20 (FIG. 3) are used. The frequencies f1 to f20 are distributed in a frequency band with the center frequency of 85 kHz. Frequency hopping can be executed by switching the frequency used in the supplied power signal between the frequencies f1 to f20.

For example, the minimum frequency Fss_start (f1) is set to 81.2 kHz. If the difference between the frequencies $I_f$ is set to 400 Hz, the maximum frequency Fss_end (f20) is 88.8 kHz in FIG. 3. The bandwidth of frequency spreading equals $I_f$*N=400 Hz*20=8 kHz. Here, N is the number of frequencies which are used. The difference between Fss_end and Fss_start is 7.6 kHz. However, as illustrated in FIG. 2 and FIG. 3, the magnetic field spectrum generated by the provided power signal has a distribution peaking in each frequency $f_i$. Therefore, the bandwidth of frequency spreading can also include 200 Hz (half of $I_f$) bandwidths each located outside of the edges of the frequency band [Fss_end, Fss_start]. In this case, the frequency band of spreading becomes [81.0 kHz, 89.0 kHz] and the bandwidth of frequency spreading becomes 8 kHz.

In the example of FIG. 3, the frequency of the provided power signal is switched between frequencies f1 to f20. The switching pattern of frequencies describes the order each frequency is going to be used in the supplied power signal. Within a single cycle of the switching pattern, the power of the supplied power signal is scattered across the frequency band Bss. Comparing the power density measured during the above cycle, at the center frequency 85 kHz for the examples of FIG. 2 and FIG. 3, for the latter case, the power density is reduced according to a function of 1/Bss in average. Also, if the number of frequencies is N, it can be said that the power density is reduced by a function of 1/N. Thus, by reducing the power density in the frequency domain, it is possible to reduce the leakage electromagnetic field strength.

Figure 4:
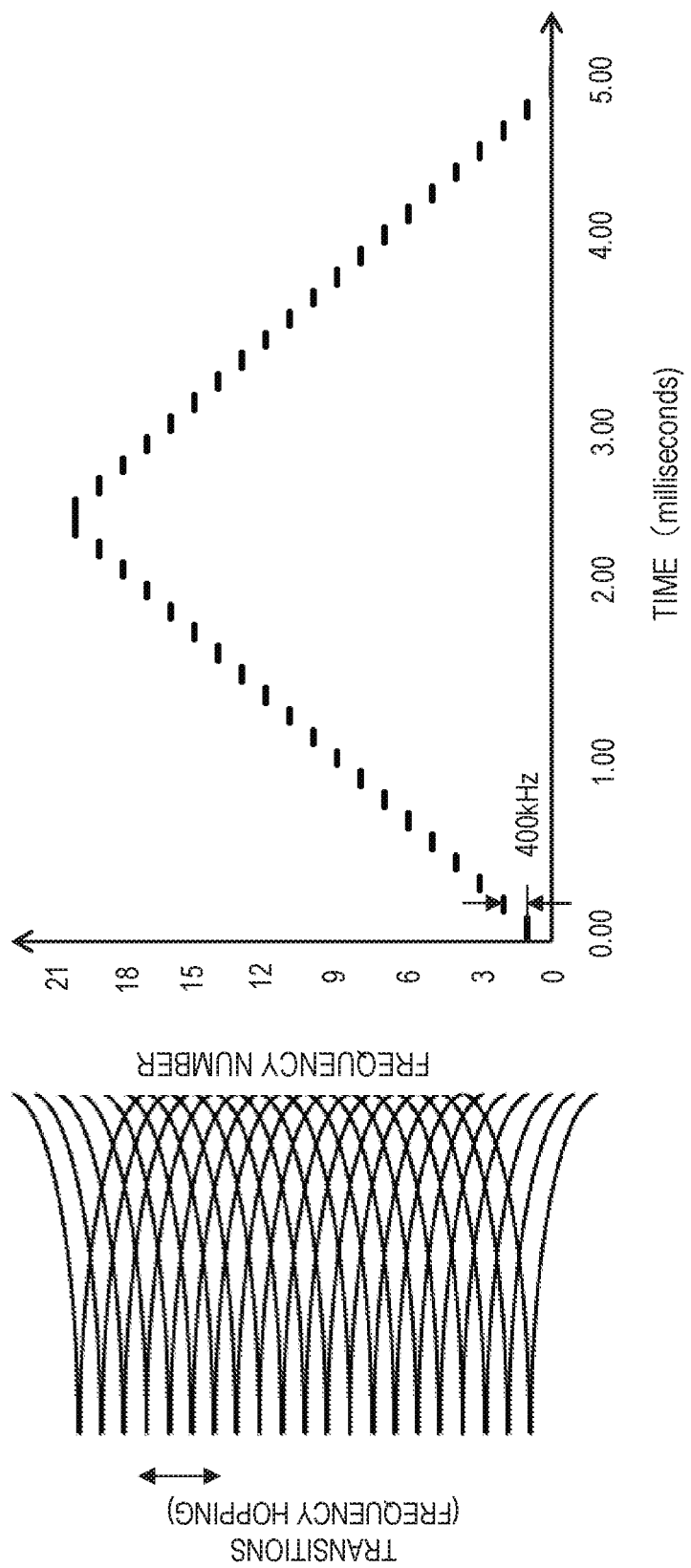
FIG. 4 is a diagram illustrating a chronological operation example of frequency hopping.

FIG. 4 is a diagram illustrating a chronological operation example of frequency hopping. FIG. 4 describes the frequency switching operation when the spectrum of FIG. 3 is used with detail. The horizontal axis of the graph in FIG. 4 represents the time in units of milliseconds. The vertical axis of the graph in FIG. 4 represents the frequency number. Here, the frequency number corresponds to the value of the index "i" for frequency fi. In the example of FIG. 4, either of the frequencies defined in the switching pattern is used for a duration of 125 microseconds. At 0 milliseconds time, frequency f1 is used. Then, the frequency is switched to frequencies f2, f3, f4, . . . in the ascending order of frequency numbers. After frequency f20 is used, the frequency is switched to frequencies f19, f18, f17, . . . in the descending order of frequency numbers.

If the frequency numbers plotted in the time domain form an approximately triangular shape as presented in FIG. 4, such switching patterns are called the "approximately triangular shaped transition". The approximately triangular shaped transition does not necessary have to be exactly the same as the example of FIG. 4. For example, the frequency used can be in the order of f19, f20, f20 and f19, using the "edge frequency" of the frequency band of spreading repeatedly. Also, the frequency used can be in the order of f19, f20 and f19, not using the "edge frequency" of the frequency band of spreading repeatedly. Furthermore, the length of the duration the same frequency is used continuously does not necessary have to be constant.

In the switching pattern of FIG. 4, each of the frequencies f1 to f20 is used two times. The duration the same frequency is used continuously is 125 microseconds. Therefore, 20*2*125 microseconds=5 milliseconds is required to complete a single switching pattern. In FIG. 3 and FIG. 4, cases when 20 frequencies are used were used as an example to explain frequency hopping. However, the number of frequencies used in frequency hopping is not limited. In order to prevent the cases from becoming too complex, mainly cases when 8 frequencies are used are mentioned in the following descriptions. However, this is not intended to limit the number of frequencies which are used in frequency hopping.

Figure 5:
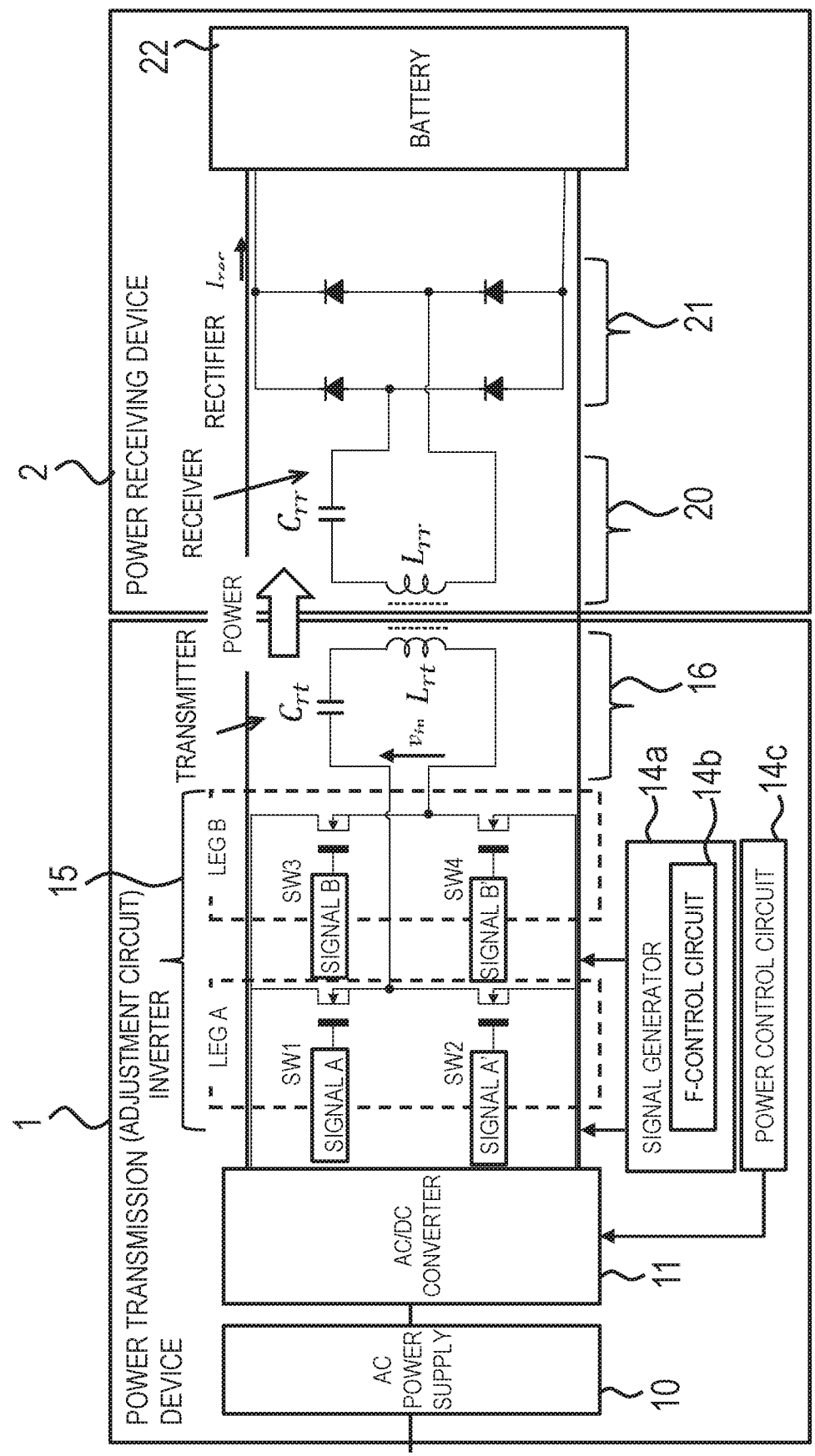
FIG. 5 is a diagram illustrating a detailed configuration example of a circuit of the non-contact power transmission system.

Next, an example of a method to reshape the waveforms of the inverter's output power by using the phase difference of the driving signal is explained with reference to FIG. 5 and FIG. 6. FIG. 5 is a diagram illustrating a detailed configuration example of a circuit of the non-contact power transmission system. In FIG. 5, the current sensor 12 and the computation circuit 13 are not illustrated. The inverter 15 controls the conduction angle by the phase difference between the leg A and leg B, thereby shaping the waveform of the output voltage signal. The inverter 15 includes switching elements SW1 to SW4. The leg A includes switching elements SW1 and SW2. The leg B includes switching elements SW3 and SW4.

The driving signal A is provided to the switching element SW1 of the inverter 15. The driving signal A' is provided to the switching element SW2. The driving signal B is provided to the switching element SW3 of the inverter 15. The driving signal B' is provided to the switching element SW4 of the inverter 15. FIG. 6 is a diagram illustrating example of driving signals A to B' in the inverter 15, the waveforms and the conduction angles of the output voltage signal.

In the following, a case when the voltage VIN of the power signal provided from the AC/DC converter 11 is constant value is explained as an example. However, the power signal provided from the AC/DC converter 11 does not necessary have to have a constant voltage value. For example, the power signal provided from the AC/DC converter 11 may have a constant current. Whether the power signal has a constant voltage value or constant current value is only a matter of design of the non-contact power transmission system.

Figure 6:
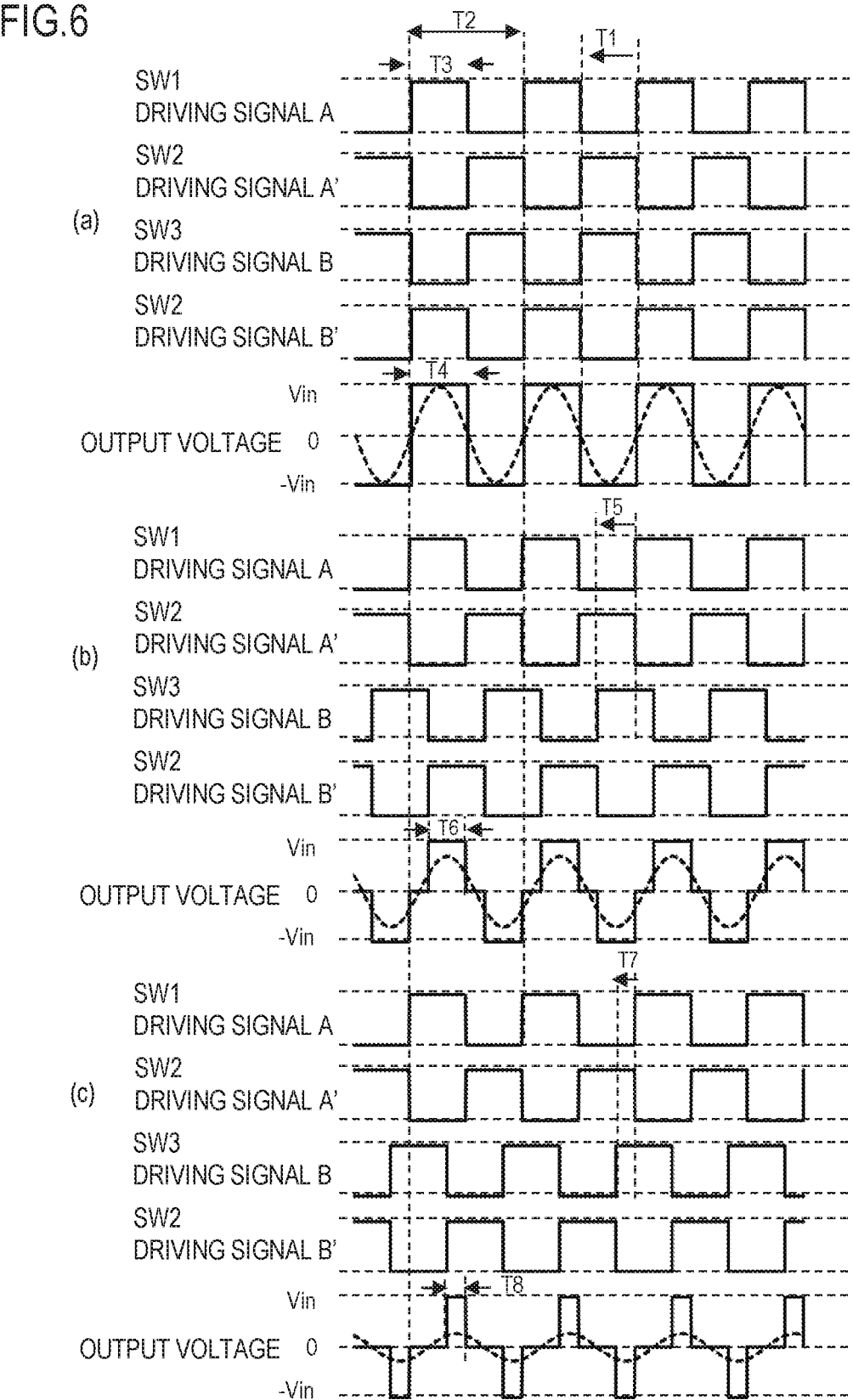
FIG. 6 is a diagram illustrating example of driving signals in the inverter, waveforms and the conduction angles of the output voltage signal.

Examples (a), (b) and (c) of FIG. 6 each describe the waveforms of the driving signals provided to each switching element and the waveform of the output voltage signal. Also, the frequency of the supplied power signal is f0 [Hz] and the period of the supplied power signal is t0=1/f0 [seconds]. For example, for FIG. 2 described above, f0=85 kHz. The driving signals A to B' provided to the switching elements SW1 to SW4 respectively are pulse signals with the same period t0 and the same duty ratio.

For the case in FIG. 6(a), the duty ratio of driving signals A to B' are 0.5=50%, for example. In the example of FIG. 6(a), the driving signals A to B' are controlled to ensure that the fundamental wave components are maximized in the waveform of the output voltage signal of the inverter 15. Since the switching element SW1 and switching element SW2 are driven by complementary operation, the driving signal A' has a phase difference (phase lead) of 180 degrees with respect to the driving signal A.

In the following, details of the phase difference are described. The phase difference is the time difference between the periodic signal waveforms. A phase lead of P degrees in a signal with a period t0 is equivalent to a lead time of P/360*t0. For periodic signals, the waveforms are invariant after a phase shift of 360 degrees. Therefore, a phase lead of P degrees is equivalent to a phase delay of (360−P) degrees. Below, the terms "phase lead" or "phase delay" are used in the explanation of the waveforms. Considering the phase shift of 360 degrees, the same phase can be expressed by using both the phase lead and the phase delay. If the absolute value is taken, a negative phase lead is equal to a positive phase delay. Similarly, by taking the absolute value, a negative phase delay is equal to a positive phase lead. Thus, a phase delay of P degrees is equivalent to a phase lead of −P degrees. Also, a phase lead of P degrees is equivalent to a phase delay of −P degrees.

In FIG. 6(a), the driving signal B has a phase lead of T1=180 degrees, with respect to the driving signal A. Also, the driving signal B' has a phase lead of 180 degrees with respect to the driving signal B. Therefore, the driving signal B' has a phase lead of 360 degrees with respect to the driving signal A, meaning that the driving signal B' and the driving signal A have the same waveforms. In FIG. 6(a), the waveform of the output voltage signal includes square waves. In the square wave, the period when the switching element of the inverter 15 is in conducting state is T4. Here, the period T4 corresponds to a phase angle of 180 degrees. The waveforms drawn with broken lines which are overlapping with the waveform of the output voltage signal each correspond to the fundamental wave components of the output voltage of the inverter 15. The fundamental wave component is the component with frequency f0 in the waveform of the output voltage signal.

In FIG. 6(b), the amplitude of the fundamental wave component in the output voltage signal is set to a smaller value with respect to FIG. 6(a). Similar to FIG. 6(a), the driving signal A' has a phase lead of 180 degrees with respect to the driving signal A. The driving signal B has a phase lead of (180−P1) degrees with respect to the driving signal A. (180−P1) degrees correspond to T5 in FIG. 6(b). Since the relation P1=60 degrees hold in FIG. 6(b), the phase lead of the driving signal B with respect to driving signal A is 120 degrees. Also, driving signal B' has a phase lead of 180 degrees with respect to driving signal B.

In the waveform of the output voltage signal of FIG. 6(b), there is a duration of t0*P1/360 [seconds] when the output voltage is 0 (OFF) for each period. Therefore, the amplitude of the fundamental wave component of the output voltage signal is smaller than FIG. 6(a). The duration T6 when the output voltage is +Vin or −Vin (ON) in the waveform of the output voltage signal corresponds to the duration the switching element of the inverter is in the conducting state. In the waveform of the output voltage signal of FIG. 6(b), the conducting angle is 120 degrees.

In FIG. 6(c), the amplitude of the fundamental wave component in the output voltage signal is set to a smaller value with respect to FIG. 6(a). The driving signal B in FIG. 6(c) has a phase lead of (180−P1) degrees with respect to the driving signal A. The duration T7 corresponds to the phase of (180−P1) degrees. In FIG. 6(c), P1 is set to 120 degrees. Therefore, the phase lead of driving signal B with respect to driving signal A is 60 degrees, making the amplitude of the fundamental wave component of the output voltage signal smaller compared to the case of FIG. 6(b). The duration T8 the output voltage is approximately +Vin or −Vin (ON) in the output voltage signal corresponds to the duration the switching element of the inverter is in the conducting state. In the waveform of the output voltage signal of FIG. 6(c), the conducting angle is 60 degrees.

Referring to the result of FIG. 6, the amplitude of the fundamental wave component of the output voltage signal is proportional to the conducting angle. If the amplitude of the fundamental wave component of the output voltage signal in the example of FIG. 6(a) is 1, the amplitude of the fundamental wave component of the output voltage signal in the example of FIG. 6(b) would be ⅔. Also, the amplitude of the fundamental wave component of the output voltage signal in the example of FIG. 6(c) would be ⅓.

The duty ratio of the driving signal is set to 0.5=50% in the examples of FIG. 6(a) to (c). However, in actual switching elements, there may be some variability in the operating timings. For example, there is a possibility that both the switching element SW1 and the switching element SW2 are turned ON simultaneously. Also, there is a possibility that both the switching element SW3 and the switching element SW4 are turned ON simultaneously. In such cases, the output of the AC/DC converter 11 may be shorted, causing excessive currents to flow in the circuit.

Therefore, in order to prevent a plurality of switching elements from being turned ON simultaneously, a dead time can be set, making the actual duty rate smaller than 0.5=50%. In some implementations of inverters, the dead times are set uniformly. In such implementations, dead times would set to the cases of FIG. 6(b) and FIG. 6(c) as well. Thus, the duration the output voltage signal is in the ON state will be shorter compared to the duty ratio which is used.

As mentioned above, by adjusting the amplitude of the fundamental wave component of the output voltage signal of the inverter 15, it is possible to control the current value provided to the transmitter 16 and the power transmitted to the receiver 20. In FIG. 5 and FIG. 6, cases when the voltage VIN of the power signal provided from the AC/DC converter 11 is constant and the power provided to the receiving side was controlled by adjusting the current value were explained. However, circuits other than the circuit of FIG. 5 can be used to control the current value provided to the transmitter 16. As mentioned above, a power signal with constant current can be provided from the AC/DC converter 11. In such cases, the voltage of the power signal provided to the transmitter 16 can be adjusted to control the power transmitted to the receiver 20.

Figure 7:
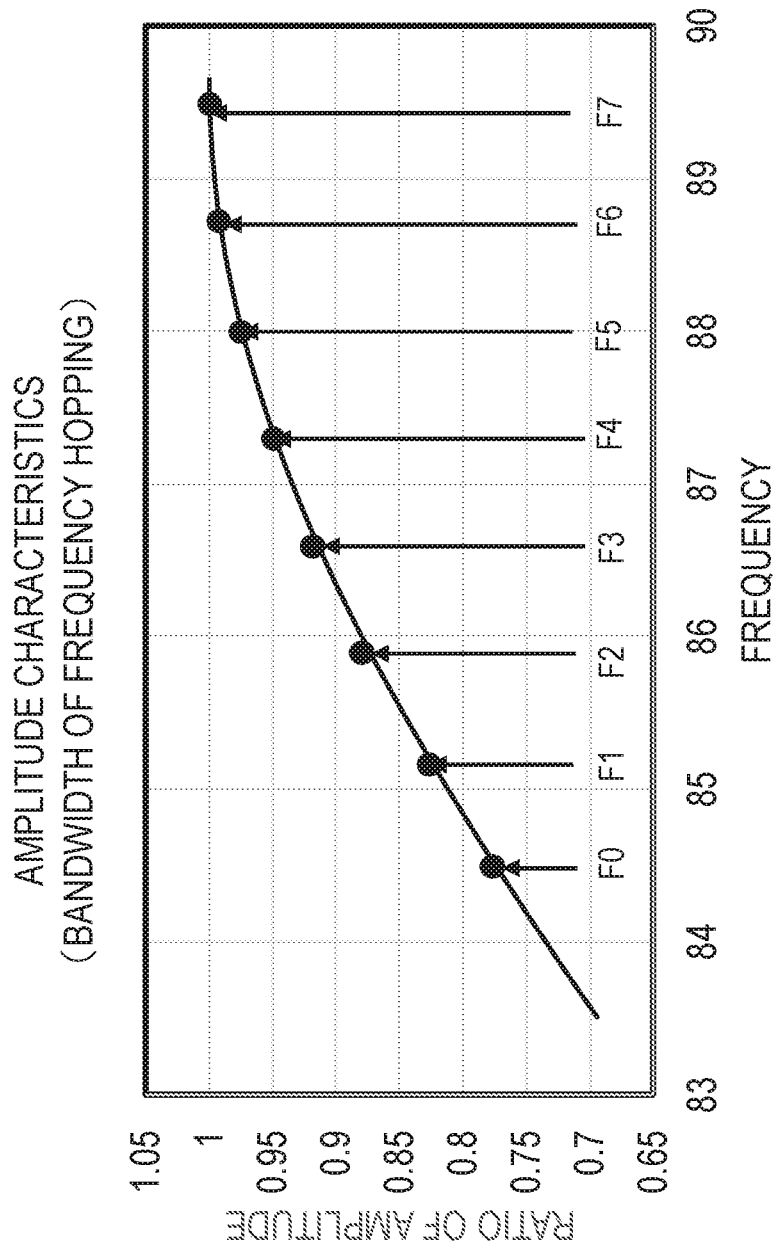
FIG. 7 is a diagram illustrating an example of fluctuations in the received power when frequency hopping between eight frequencies is applied for the supplied power signal.

FIG. 7 is a diagram illustrating an example of fluctuations in the received power when frequency hopping between eight frequencies (F0 to F7) is applied to the supplied power signal. Examples of the received power include the power value of the power signal provided to the battery 22 of the power receiving device 2. FIG. 7 presents an example when the phase difference between the legs of the inverter 15 is set to a constant value, for the non-contact power transmission system of FIG. 5. In FIG. 7, if the frequency of the supplied power signal is F4, the power provided to the battery 22 is 1.0. If the frequency of the supplied power signal is switched to either F0 to F6, the power provided to the battery 22 is presented by the ratio relative to 1.0.

In the non-contact power transmission system, a circuit including elements such as coils and capacitors are implemented to ensure that the resonance condition is satisfied in a specific frequency. In order to reduce the harmonic components of the electromagnetic field which is not used for the transmission of power, a filter circuit not illustrated in FIG. 1 can be implemented. Generally, in frequencies which satisfy the resonance condition of the circuit, not only the power transmitted to the receiving side but also the maximum distance of non-contact power transmission becomes greater. Since the non-contact power transmission system has certain frequency characteristics, the greater the deviation from the resonance frequency becomes, the smaller the power transmitted to the receiving side and the maximum distance of non-contact power transmission becomes.

In the plurality of frequencies indicated in the example of FIG. 7, frequency F7 is closest to the resonance frequency. In FIG. 7, the deviation from the resonance frequency becomes greater according to the descending order of frequency numbers (F6, F5, F4, . . . ). Therefore, the power provided to the battery of the power receiving device 2 will decrease in the descending order of frequency numbers. For example, if frequency F0 is used, less than the eighth of the power provided in frequency F7 could be provided. In a non-contact power transmission system with the frequency characteristic of FIG. 7, if frequency hopping is applied to the supplied power signal, there would be some ripples in the received power signal as illustrated in FIG. 8.

Figure 8:
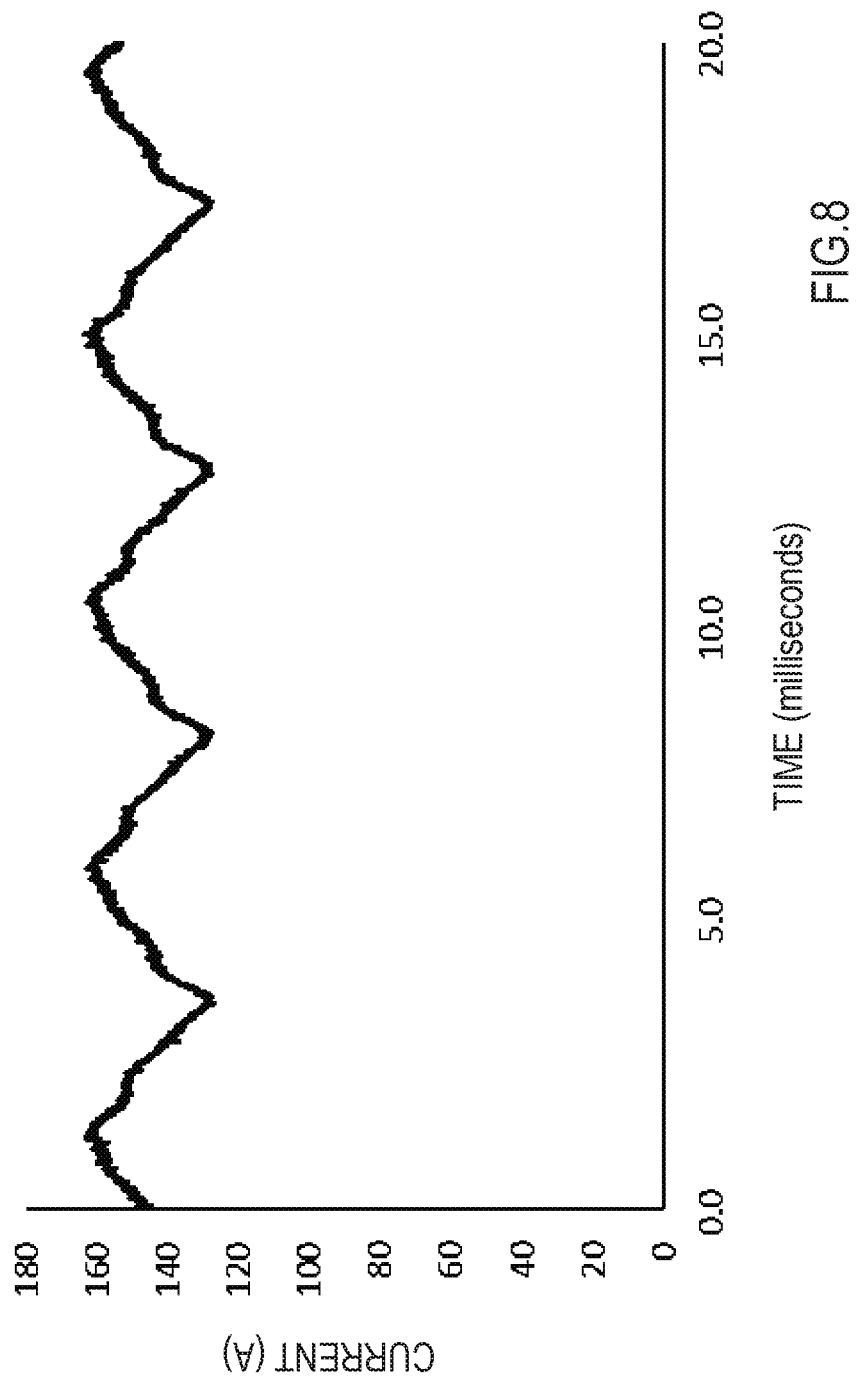
FIG. 8 is a diagram illustrating an example of ripples in the received power signal when frequency hopping is applied to the supplied power signal.

In the example of FIG. 8, the battery 22 is charged using a power signal with a constant voltage value. Therefore, the fluctuation of the supplied power can be observed in the form of fluctuating current values. Referring to FIG. 8, ripples causing the current value to fluctuate within the range of around 124 A to 162 A can be observed. Generally, in secondary batteries such as the battery 22, the range of the acceptable current value is defined by the specification. For example, in the specification, it may be defined that a current with a deviation of ±5% respect to the reference value can be provided to the battery. Therefore, if the ripple components in the current of the power signal become too large, it may be difficult to use the corresponding power signal for charging the secondary battery. In example of FIG. 8, the power signal includes a ripple component with an amplitude of approximately 38 A. This ripple component of the power signal causes the current value to fluctuate ±10% with respect to the reference value. In the example of FIG. 8, some countermeasures are need to be taken in order to reduce (cancel out) the ripple components in the current.

In the non-contact power transmission system of FIG. 5, the phase difference between leg A and leg B of the inverter 15 was changed to adjust the current value of the provided power signal (FIG. 6). Since the supplied power signal of the non-contact power transmission system of FIG. 5 has a constant voltage value, the current value (in other words, the phase difference of the legs in the inverter 15) can be changed to adjust the power value provided to the receiving side device.

Figure 9:
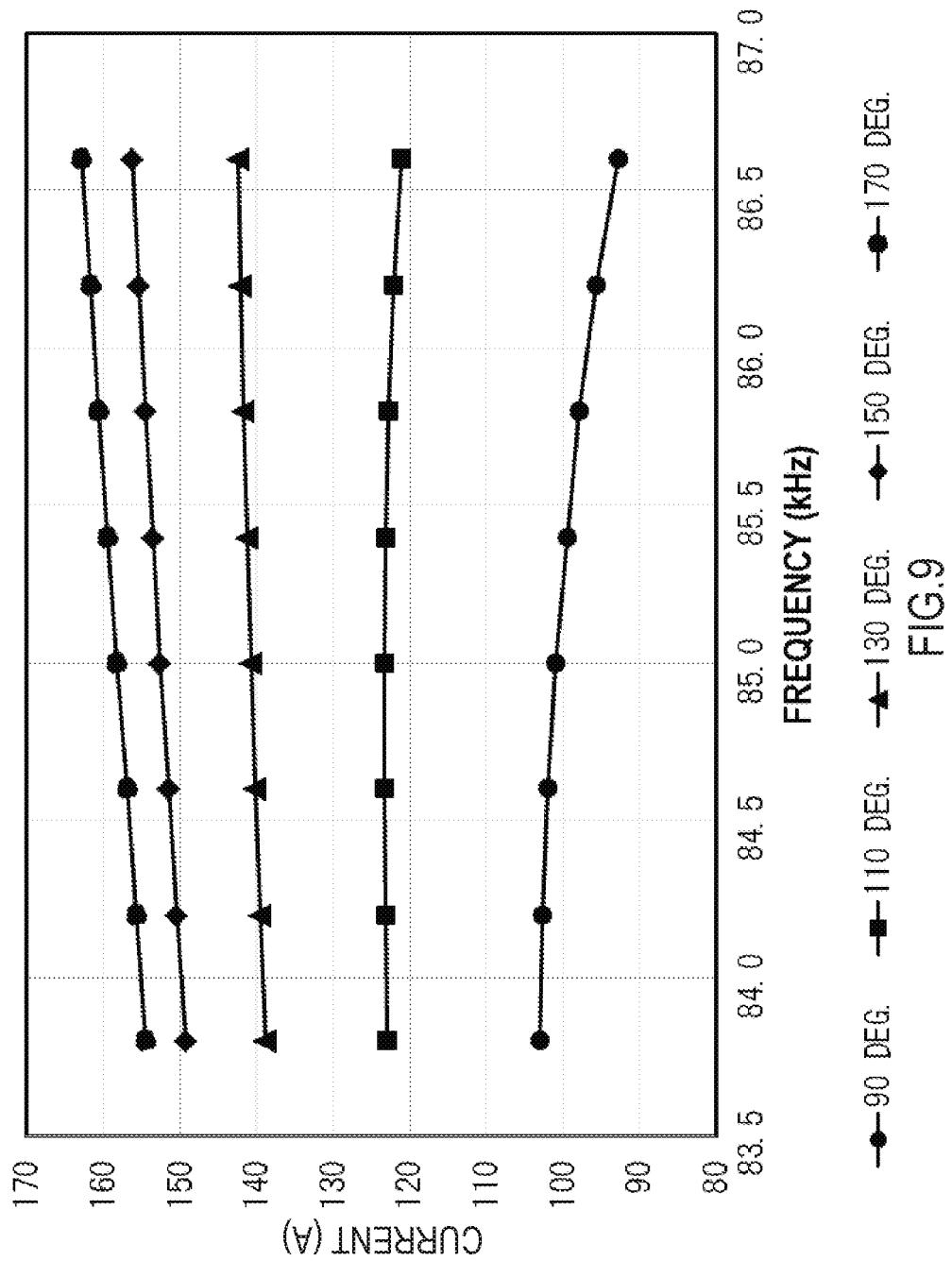
FIG. 9 is a diagram illustrating an example frequency characteristic of current value for the received power signal when the phase difference of legs in the inverter is set to a plurality of values.

FIG. 9 is a diagram illustrating an example frequency characteristic of current value for the power signal provided to the battery 22, when the phase difference of legs in the inverter 15 are set to a plurality of values. The vertical axis of FIG. 9 represents the current value. The horizontal axis of FIG. 9 represents the frequency. Referring to FIG. 9, if the phase difference of the legs is 90 degrees, the frequency of the power signal is 85.0 kHz and the current value is approximately 100 A. In this case (phase difference of 90 degrees), the current value becomes smaller as the frequency of the power signal increases. If the phase difference of the legs is 170 degrees, the current value is exceeding 150 A for all the frequencies presented in FIG. 9. In this case (phase difference of 170 degrees), the current value increases as the frequency of the power signal increases.

Figure 10:
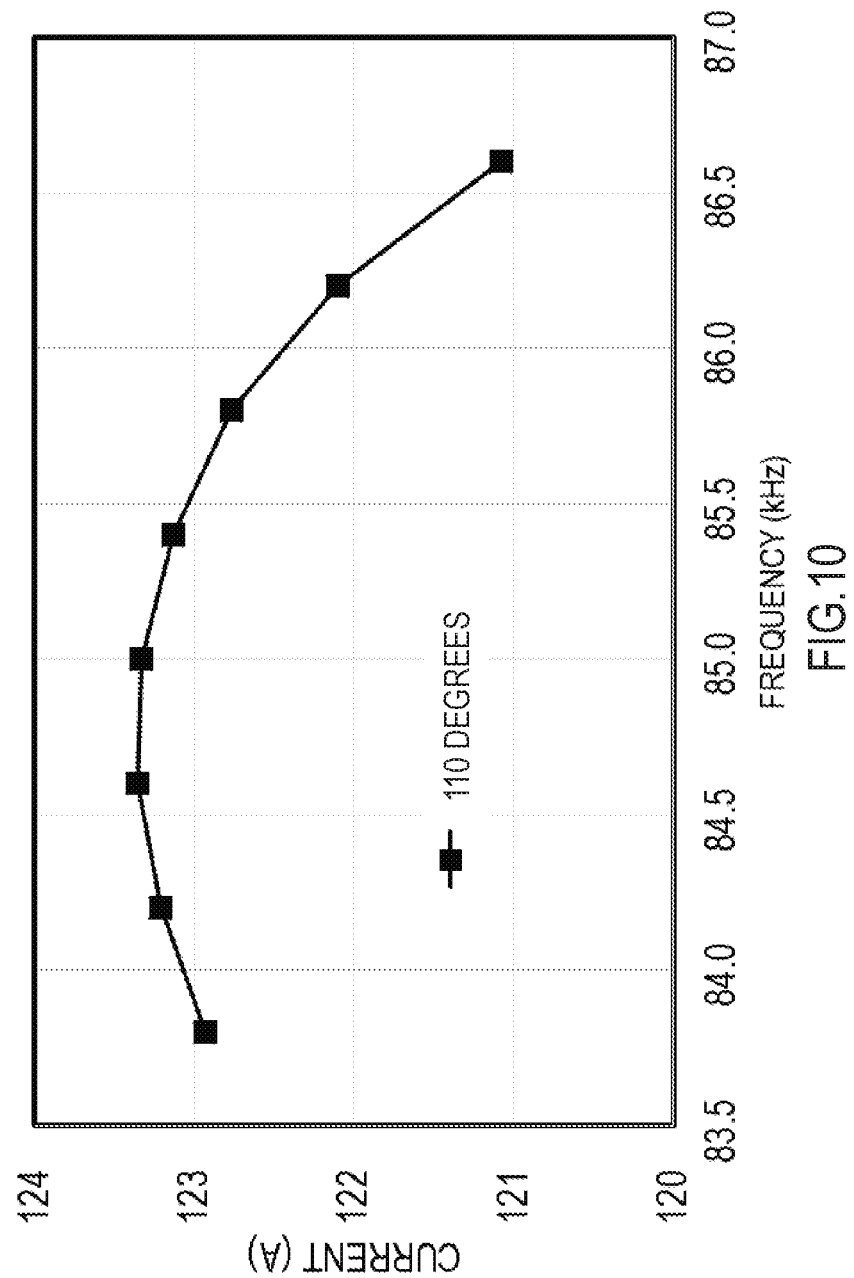
FIG. 10 is a diagram illustrating an example frequency characteristic of current value when the phase difference of legs in the inverter is equal to 110 degrees.
Figure 11:
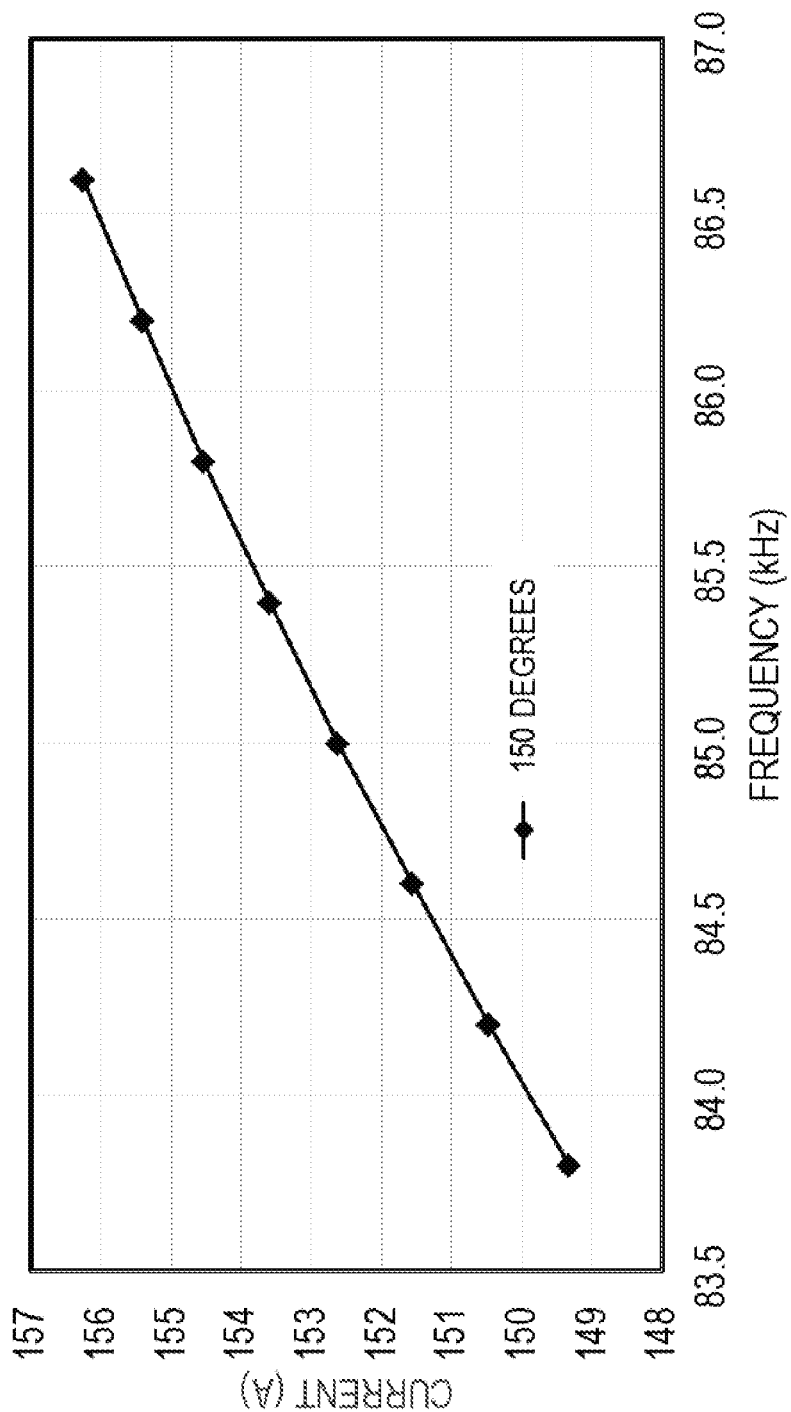
FIG. 11 is a diagram illustrating an example frequency characteristic of current value when the phase difference of legs in the inverter is equal to 150 degrees.

FIG. 10 is a diagram illustrating an example frequency characteristic of current value when the phase difference of legs in the inverter 15 is 110 degrees, with an enlarged view. Referring to the graph of FIG. 10, if the frequency of the power signal increases from 83.5 kHz to 84.5 kHz, the current value increases as well. However, if the frequency increases to values beyond 84.5 kHz, the current value decreases. FIG. 11 is a diagram illustrating an example frequency characteristic of current value when the phase difference of legs in the inverter 15 is 150 degrees, with an enlarged view. Referring to the graph of FIG. 11, the current value is increasing monotonically along with the increase of the frequency of the power signal. It can be noted that the frequency characteristic illustrated in FIG. 11 is almost linear.

Depending on the power value or the current value of the supplied power signal, the frequency characteristic of the non-contact power supplying system changes. In order to stabilize the power value or the current value supplied to the receiving side device, the phase difference between the legs of the inverter 15 can be adjusted to ensure that the fluctuations in the power values or the current values of the supplied power signal are reduced. For the reduction of ripple components in the power signal, it is possible to approximate the frequency characteristics by using polynomial equations.

For the reduction of ripple components, the frequency characteristic at each power value can be stored. Then, it is possible to select the control process which is executed based on the conditions. However, in this method, the frequency characteristic need to be measured beforehand. Then, the data of the measured frequency characteristics need to be configured to the devices. Therefore, preparation and the manufacturing process of the products would become much more complicated. Also, in non-contact power transmission systems, the frequency characteristic tend to change easily depending on the allocation of the coils. Therefore the actual frequency characteristic may not match exactly with the frequency characteristic configured to the devices, making effective reduction of ripples components difficult.

For example, the non-contact power transmission system according to the embodiment calculates a polynomial equation which approximates the frequency characteristic during operation. Therefore, ripple components in the power signal can be reduced without measuring the frequency characteristic and configuring the data of the frequency characteristic to the devices during or before manufacture.

In the following, the method for reducing the ripples components is explained with reference to FIG. 1. If the reduction of ripple components in the power signal provided to the battery 22 of the power receiving device 2 is required, the power signal measured in other locations can be used as the basis of control process. In the power transmission device 1 of FIG. 1, a current sensor 12 is located between the AC/DC converter 11 and the inverter 15. Here, the reason why the power signal provided to the inverter 15 is used is because some correlation exists between the power signal provided to the inverter 15 and the power signal provided to the battery 22.

Since the power value and the current value are correlated, the power value of the power signal can be measured instead of the current value. If the voltage of the power signal provided to the battery 22 and the voltage of the power signal provided to the inverter 15 are correlated, the voltage value can be measured as well. For the example used in the description, since a signal with constant voltage value is provided to the inverter 15, it is possible to detect the fluctuation of power values based on the current value measured by the current sensor 12.

Figure 13:
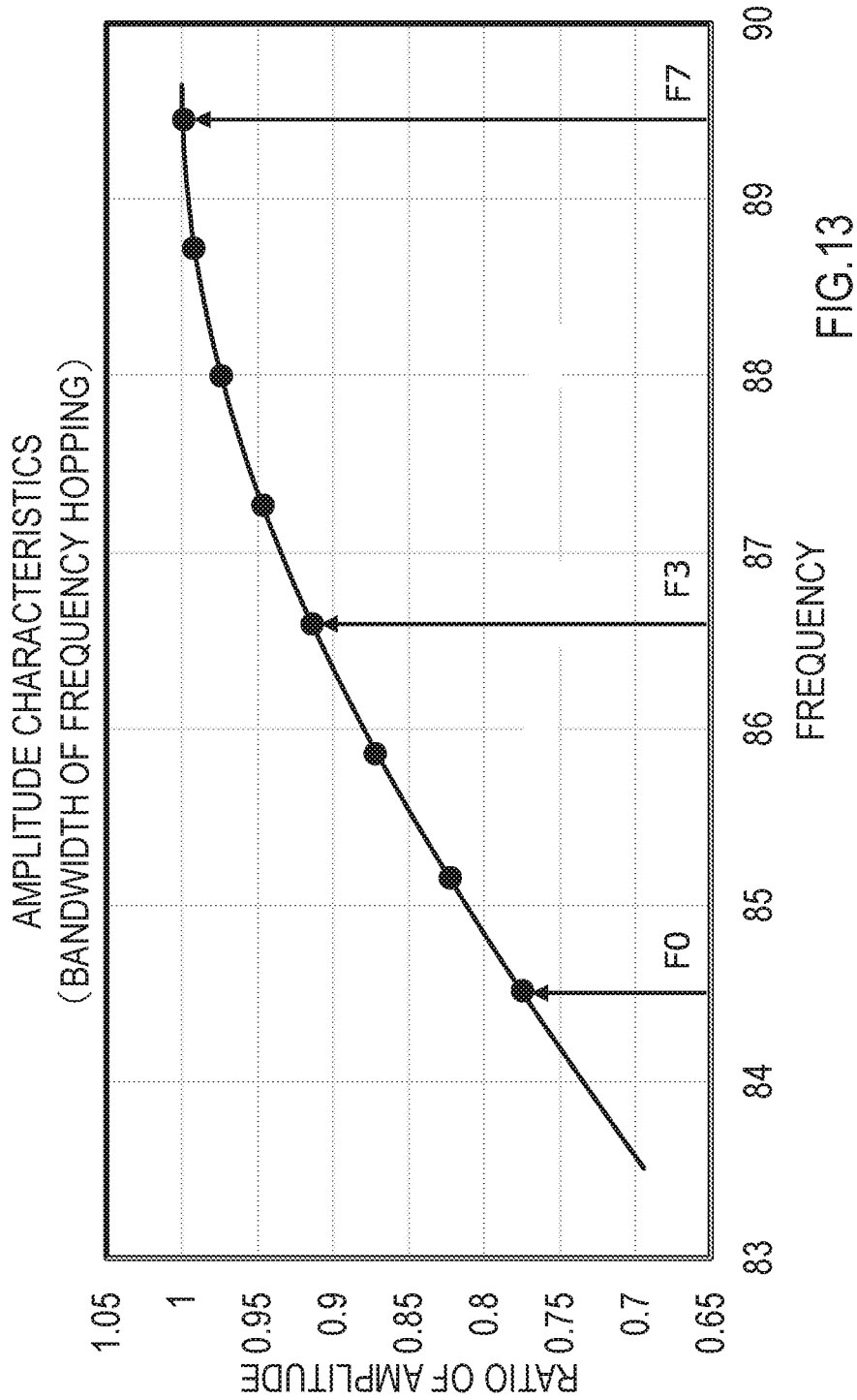
FIG. 13 is a diagram illustrating an example of measurement timings of current values.

The current sensor 12 can measure the current value according to the frequency switching (hopping) timing of the supplied power signal generated by the inverter 15. The current sensor 12 is an example of a sensor which measures the power signal in a plurality of timings each with a different frequency used in the power signal. The measured value of the sensor can be values other than the current such as the voltage value. For example, suppose the frequency control circuit 14b is switching the frequency of the provided power signal using the eight hopping frequencies of F0 to F8 according to the switching pattern. In this case, the current value can be measured when the frequencies F0, F3 and F7 are used in the supplied power signal, as illustrated in FIG. 13. For example, the frequency control circuit 14b can generate timing signals when the frequencies F0, F3 and F7 are used in the supplied power signal. The timing signals are provided to the current sensor 12.

Figure 12:
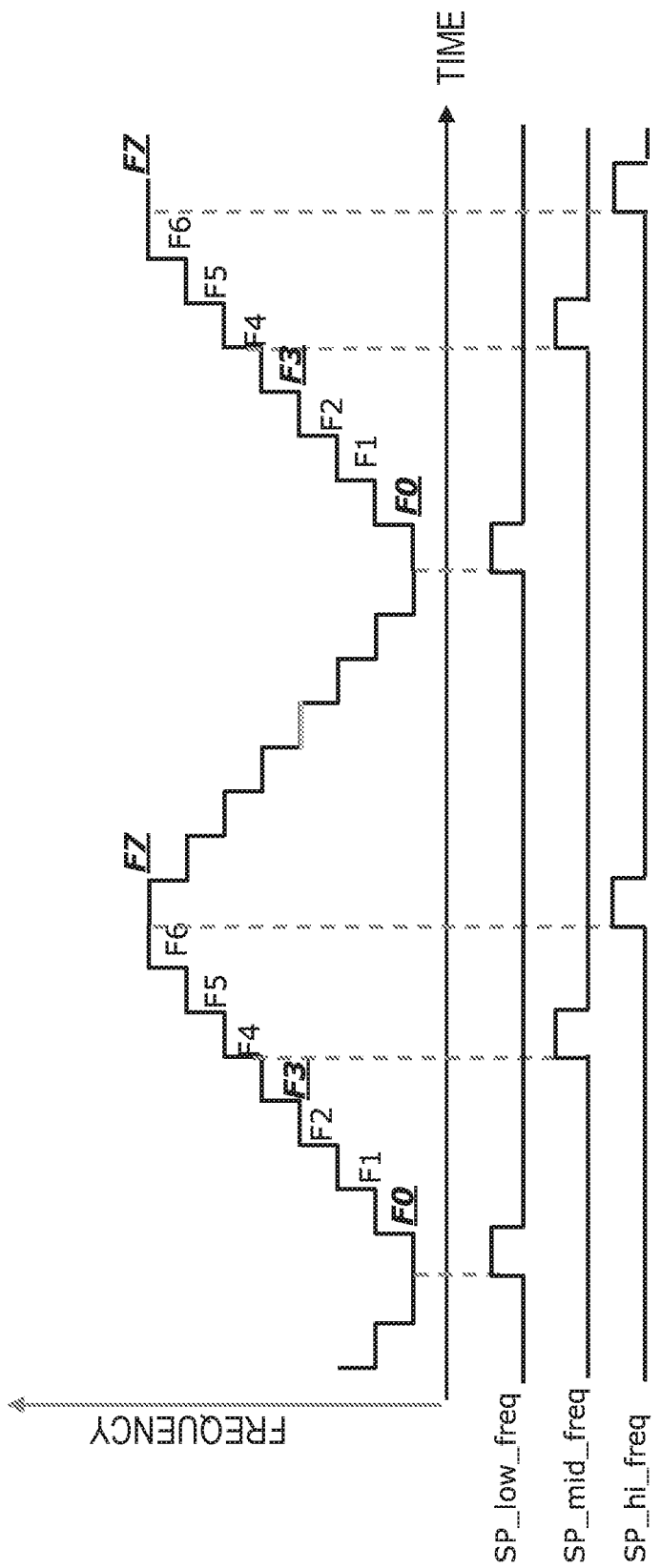
FIG. 12 is a diagram illustrating an example of timing signal provided to a current sensor.

FIG. 12 is a diagram illustrating an example of timing signal provided to a current sensor 12. The graph in the top side of FIG. 12 presents the timings for switching the frequencies of the supplied power signal. The vertical axis represents the frequency. The horizontal axis represents the time. In the bottom side of FIG. 12, three different timing signals (SP_low_freq, SP_mid_freq and SP_hi_freq) are presented. The timing signal SP_low_freq is generated when the frequency of the supplied power signal is F0. The timing signal SP_mid_freq is generated when the frequency of the supplied power signal is F3. The timing signal SP_hi_freq is generated when the frequency of the supplied power signal is F7.

The power transmission device 1 has three registers 19 (Reg_low_freq, Reg_mid_freq and Reg_hi_freq). The current sensor 12 stores the measured current value to the corresponding register when the rising edges of each timing signal are detected. The register Reg_low_freq stores the current value measured when the frequency F0 is used in the supplied power signal. The register Reg_mid_freq stores the current value measured when the frequency F3 is used in the supplied power signal. The register Reg_hi_freq stores the current value measured when the frequency F7 is used in the supplied power signal. The current values stored in each register 19 are provided to the computation circuit 13. The computation circuit 13 approximates the frequency characteristic by using polynomial equations and calculates the parameters.

Each current sensor 12 can be detecting at least either the edges or the levels of the timing signals. Therefore, the current sensor 12 can be triggered in any way by the timing signals. Also, the registers are only an example of elements which can be used to store the measured values of the sensors. Therefore, the measured values of the sensors can be stored in other elements such as various volatile memory devices, non-volatile memory devices or various storage devices.

For example, a quadratic polynomial equation which provides the relation between the phase difference in the legs of the inverter 15 and the frequency of the supplied power signal generated by the inverter 15 can be calculated by the computation circuit 13. Since the frequency control circuit 14b controls the phase difference in the legs, the phase difference of the legs is used instead of the current value (voltage value), in the equation which approximates the frequency characteristics. Using the notation fn (n=0, 1, 2 . . . ) for each frequency, the phase difference of the legs C(fn) can be expressed by using the quadratic function notation as described in the equation (1) below.

$$C(fn) = C(\theta n, fn) = \theta_0 + \theta_1 fn + \theta_2 fn^2 \quad (1)$$

For example, the coefficients $\theta_0$, $\theta_1$ and $\theta_2$ in equation (1) can be estimated by using the steepest descent method. The coefficient $\theta_0$ corresponds to the phase difference of the legs when fn=0 holds. However, if it is assumed that the coefficient $\theta_0$ is the phase difference of the legs when the frequency is f0, it is possible to exclude the coefficient $\theta_0$ from the scope of estimation process. Therefore, the coefficient $\theta_1$ and the coefficient $\theta_2$ are estimated by using the steepest descent method.

By updating the value of the coefficient $\theta_1$ using the equation (2) below, the value of the coefficient $\theta_1$ can be estimated.

$$\theta_1 := \theta_1 - \eta \sum_{i=0}^{fn} (Iout(fn) - Iout(fo)) fn \quad (2)$$

Similarly, by updating the value of the coefficient $\theta_2$ using the equation (3) below, the value of the coefficient $\theta_2$ can be estimated.

$$\theta_2 := \theta_2 - \eta \sum_{i=0}^{fn} (Iout(fn) - Iout(fo)) fn^2 \quad (3)$$

For example, suppose the current value stored in the register Reg_low_freq is Iout(f0). Suppose the current value stored in the register Reg_mid_freq is Iout(f3). Also, suppose the current value stored in the register Reg_hi_freq is Iout(f7). Then, Iout(f0), Iout(f3) and Iout(f7) can be substituted to the aforementioned equations (2) and (3), respectively. By adjusting the learning rate $\eta$ and updating the equation multiple times, the values of the coefficients can be calculated. If the coefficients are calculated by approximation by quadratic functions, at least three data samples are needed to specify the shape of the curve.

In the example above, the current value was measured in three different timings when different frequencies were used in the supplied power signal. The current was measured in the power transmission device 1. Also, a quadratic polynomial equation was approximated for the relation between the phase difference of legs and the frequency of the generated supplied power signal, based on the measured values of current. During the approximation, the values of the coefficients were calculated by using the steepest descent method. The frequency control circuit 14b can determine the phase difference of legs in the inverter 15 based on the approximated quadratic polynomial. Thereby, the ripple components in the power signal provided to the battery 22 of the power receiving device 2 can be reduced. Thus, the controller 14 (computation circuit 13) can be configured to calculate the frequency characteristic by based on polynomial approximation and steepest descent method.

In the first embodiment, the coefficients of the approximated equation were calculated by using the steepest descent method. However, this method is only an example. Therefore, other methods can be used to calculate the coefficients of the approximated equation. For example, instead of using methods which update the coefficients sequentially, methods which involve the solving of simultaneous equations can be used. Also, the current value can be measured in four or more timings each with different frequencies used in the supplied power signal. Therefore, the number of data samples used during the approximation process is not limited. Also, functions other than the quadratic polynomials can be used to the approximate the frequency characteristics.

Second Embodiment

The method for estimating the frequency characteristic described in the first embodiment is only an example. Therefore, other methods can be used for estimating the frequency characteristics. In the second embodiment, a method for estimating the frequency characteristic using simple methods is described. In the following, the second embodiment is described mainly focusing on the difference between the first embodiment and the second embodiment.

As mentioned in the description of equation (1), if it is supposed that the coefficient $\theta_0$ is the phase difference of legs in frequency f0, the coefficient $\theta_0$ can be excluded from the scope of estimation process. Therefore, the first degree term and the second degree term of equation (1) can be rewritten as presented in the following equation (4).

$$C'(\theta n, fn) = \theta_1 fn + \theta_2 ((fn - fcnt)^2 - fcnt^2) \quad (4)$$

Here, fcnt is the center frequency in frequency hopping. If the number of frequencies is an even number, fcnt can be set to the average of two frequencies which are the closest to the center of the frequency band. Comparing the equation (4) with the equation (1), it could be found that the basis function of the coefficient $\theta_2$ has been changed from $fn^2$ to $((fn-fcnt)^2-fcnt^2)$.

For the frequency fn, the relative value from the lowest frequency f0 is used. Thus, calculation is executed supposing that f0 is 0 Hz. When fn=f0 and fn=fmax (fmax is the maximum frequency of hopping frequencies) holds, the equation (fn−fcnt)=fcnt holds. Therefore, in the minimum frequency f0 and the maximum frequency fmax, the basis function of the coefficient $\theta_2$ becomes 0, canceling the effect of the second degree term. Thus, the coefficient $\theta_1$ can be calculated directly for the frequencies f0 and fmax.

Then, the coefficient $\theta_1$ of the first degree term can be calculated by using the the steepest descent method and the following equation (5). By updating the equation (5) multiple times, the coefficient $\theta_1$ can be calculated.

$$\theta_1 := \theta_1 - \eta_1(I_{out}(fmax) - Iout(fo)) \quad (5)$$

In this embodiment, the calculation of the coefficient $\theta_2$ is executed for frequencies other than the minimum frequency f0 and the maximum frequency fmax, since the basis function has been altered. The coefficient $\theta_2$ can be calculated by using the following equation (6). By updating the equation (6) multiple times, the coefficient $\theta_2$ can be calculated.

$$\theta_2 := \theta_2 - \eta_2(Iout(fcnt') - (iout(fmax) + Iout(fo))/2) \quad (6)$$

Here, fcnt' is the frequency which is closest to fcnt. If the number of hopping frequencies is an even number, either of the frequencies which are closest to fcnt can be used as fcnt'. In equation (5) and (6), Iout( . . . ) indicates the current value measured when the supplied power signal is using the frequency noted within the brackets.

Thus the controller 14 (the computation circuit 13) can be configured to calculate: a first degree term coefficient of the frequency characteristic based on the value measured at a first frequency and the value measured at a second frequency (each corresponding to the minimum frequency f0 and the maximum frequency fmax, respectively); and a second degree term coefficient of the frequency characteristic based on at least the value measured at a third frequency (for example, a frequency other than the minimum frequency f0 and the maximum frequency fmax).

Figure 14:
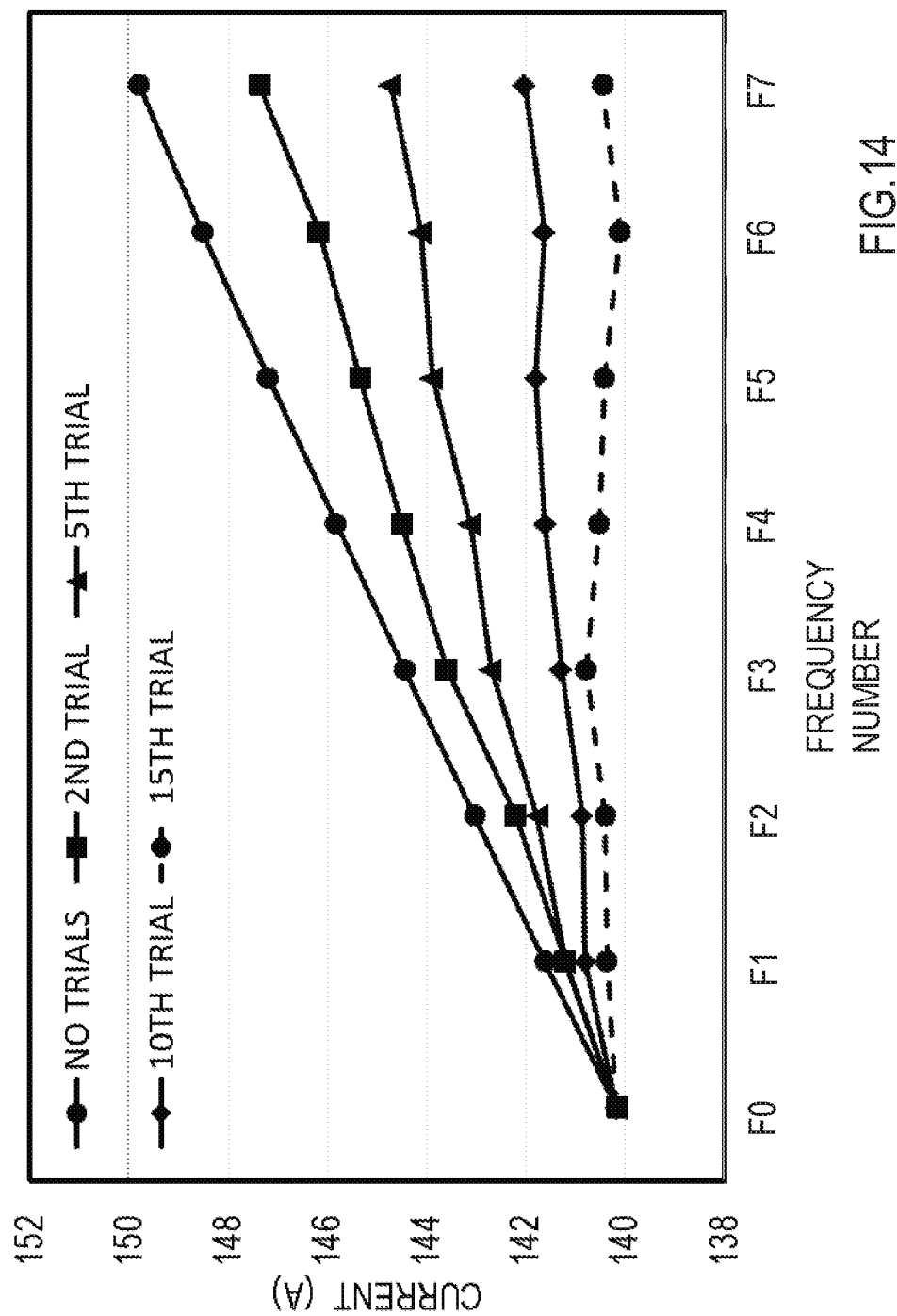
FIG. 14 is a diagram presenting the result obtained when the phase difference between legs is calculated and the inverter is controlled according to the method of the second embodiment.

By using the method described in the embodiment, the calculation of the coefficients $\theta_1$ and $\theta_2$ can be executed independently. By calculating each coefficient independently, the occurrence of mutual interference between the first degree term and the second degree term can be prevented, enabling the convergence of calculated values within a shorter period of time. FIG. 14 presents the result when the coefficients $\theta_1$ and $\theta_2$ are updated according to the method of the embodiment and the phase difference of the inverter 15 is changed accordingly during the control process. Referring to FIG. 14, before the control process is started (when there are no updates in coefficients), there is an approximately 10 A difference in the current value, between the case when the frequency of the supplied power signal is F0 and the case when the frequency of the supplied power signal is F7. However, if the number of updates for coefficients reaches fifteen times, the fluctuation of current values are smaller than approximately 0.5 A, regardless of the frequency used in the supplied power signal. Thus, it can be said that the ripple components are reduced after fifteen updates of coefficients. By executing the control process according to the embodiment, a power signal with an almost constant current can be provided to the battery 22.

The configuration of the non-contact power transmission system according to the second embodiment is similar to the non-contact power transmission system according to the first embodiment.

Third Embodiment

As presented in FIG. 10, the frequency characteristic of the non-contact power transmission system may be non-linear. In such cases, the frequency characteristic can be approximated by using non-linear polynomials, for the sake of effective reduction of ripple components, as mentioned in the first and second embodiments.

As presented in FIG. 11, the frequency characteristic of the non-contact power transmission system could be linear, depending on conditions. For example, if it is discovered that the frequency characteristic of the non-contact power transmission system is almost linear, approximation by linear equations can be executed. In the third embodiment, approximation using linear equations is described. In the following, the third embodiment is explained focusing mainly on the difference from the first embodiment and the second embodiment.

For example, approximation of the frequency characteristic with first degree terms can be executed. By using linear approximation, the amount of calculation required for estimating the values of coefficients can be reduced, shortening the overall time required for processing. If linear approximation is used, the minimum number of data samples which is required is two. However three or more data samples can be used in the calculation. Here, each data sample corresponds to the current value measured when each frequency is used in the supplied power signal. If linear approximation is used, the phase difference in the legs of the inverter 15 can be described according to the following equation (7).

$$C(fn) = C\theta(fn) = \theta_0 + \theta_1 fn \quad (7)$$

Here, $\theta_0$ is the phase difference in the legs of the inverter 15 when the frequency of the supplied power signal is F0. If the value of $\theta_0$ is already known, only the calculation of the coefficient $\theta_1$ of the first degree term is needed. The coefficient $\theta_1$ can be calculated by the following equation (8). By updating the equation (8) multiple times, the coefficient $\theta_1$ can be calculated.

$$\theta_1 := \theta_1 - \eta_1(Iout(f\max) - Iout(fo)) \quad (8)$$

Here, f0 is the minimum frequency of hopping. Also, fmax is the maximum frequency of hopping. Iout( . . . ) is the current value measured when the supplied power signal is using the frequency noted within the brackets. If frequency hopping using eight frequencies (F0 to F7) is executed for the supplied power signal, the current value measured when the frequency F0 is used and the current value measured when the frequency F7 is used can be used. Then, the steepest descent method is applied using the learning rate $\eta 1$.

Other than the executed process described above, the configuration of the non-contact power transmission system according to the third embodiment is similar to the non-contact power transmission system according to the first embodiment.

Fourth Embodiment

In the non-contact power transmission system according to the first embodiment, the current value of the DC power signal was measured in the power transmission device 1. However, the current value of the power signal in other locations can be measured. Also, the measured power signal can be either DC or AC. In the non-contact power transmission system according to the fourth embodiment, the current value of the AC power signal is measured in the power receiving device 2. In the following, the non-contact power transmission system according to the fourth embodiment is described, mainly focusing on the difference between the fourth embodiment and the first embodiment.

Figure 15:
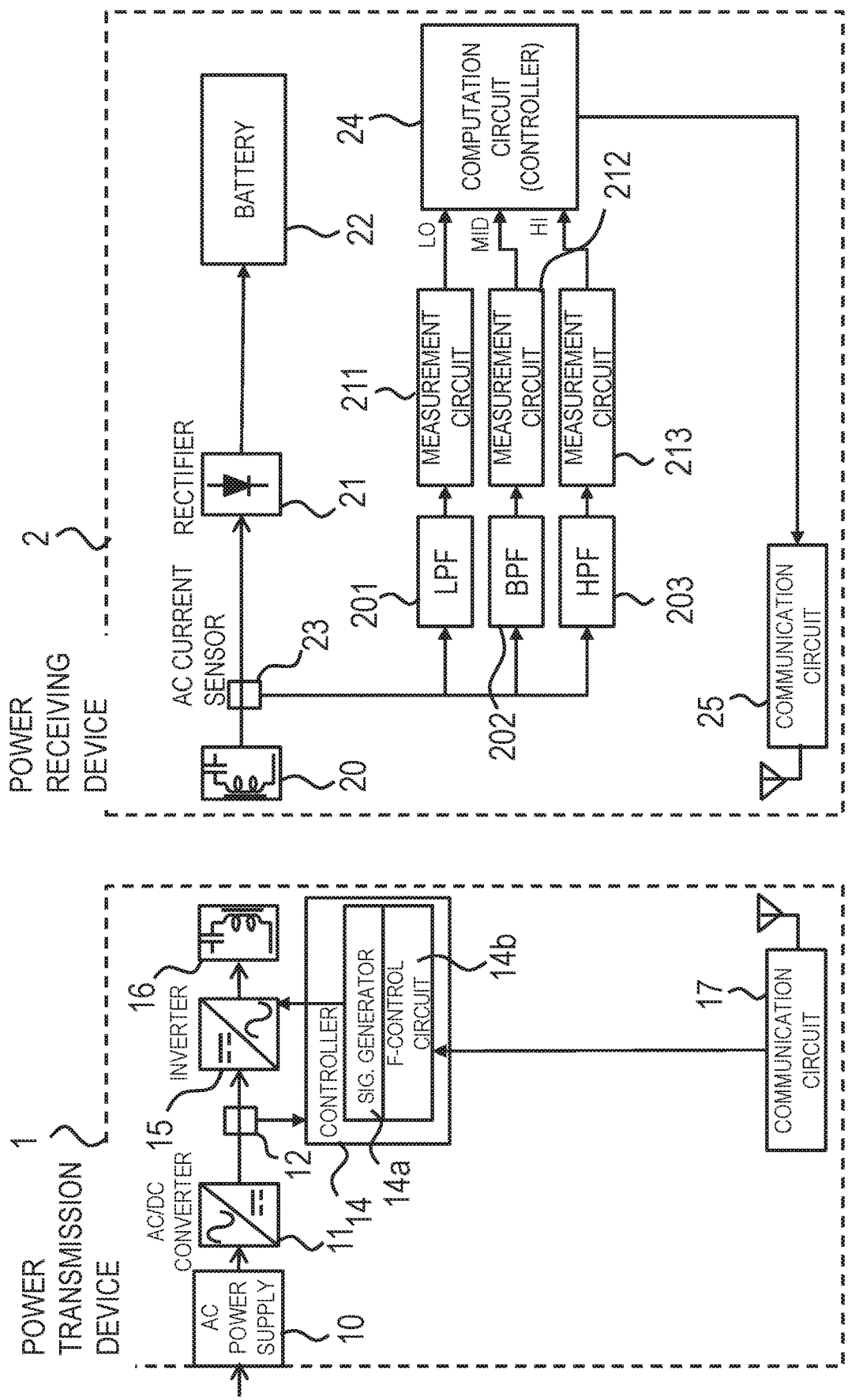
FIG. 15 is a block diagram illustrating a configuration example of a non-contact power transmission system according to a fourth embodiment.

FIG. 15 is a block diagram illustrating a configuration example of a non-contact power transmission system according to a fourth embodiment. The non-contact power transmission system in FIG. 15 includes an AC power supply 10, an AC/DC converter 11, a current sensor 12, a controller 14, an inverter 15, a transmitter 16 and a communication circuit 17. The controller 14 includes a signal generator 14a and a frequency control circuit 14b. The power transmission device 1 of FIG. 15 does not necessary need to have a computation circuit 13 and a register 19. The current sensor 12 is connected between the AC/DC converter 11 and the inverter 15. The current sensor 12 measures the DC power signal and provides the measured value to the controller 14.

The controller 14 can calculate the relationship between the configured value for the phase difference of the legs in the inverter 15 and the current value of the power signal measured by the current sensor 12. For example, the regression equation can be calculated based on the power value of the power signal measured when different configured values are used for the phase difference. However, the method used for calculating the above relation is not limited. The controller 14 stores the data including the calculated relation between the phase difference of the legs in the inverter 15 and the current value of the power signal to the memory or storage in the controller 14. If sensors which measure the voltage value or the power value of the power signal exist, the controller 14 can calculate the relation between the phase difference in the legs of the inverter 14 and the voltage value or the power value of the power signal.

The communication circuit 17 can receive data from the communication circuit 25 of the power receiving device 2 by wireless communication. The communication circuit 17 can include an antenna. Also, the communication standard used by the communication circuit 17 is not limited. The communication circuit 17 transmits the control signal including the result calculated by the computation circuit (controller) 24 in the power receiving device, to the frequency control circuit 14b. The frequency control circuit 14b controls the phase difference of the legs in the inverter 15 based on the result calculated by the computation circuit 24. Except the above differences, the configuration of each component in the power transmission device 1 is similar to the non-contact power transmission system according to the first embodiment. Therefore, the power transmission device 1 according to the fourth embodiment also executes frequency hopping of the supplied power signal.

The power receiving device 2 in FIG. 15 includes an AC current sensor 23, a low pass filter 201, a band pass filter 202, a high pass filter 203, measuring circuits 211 to 213, a computation circuit 24 and a communication circuit 25, other than the components of the receiving device according to the first embodiment. The AC current sensor 23 measures the current of the AC power signal received by the receiver 20. The AC current sensor 23 provides an AC signal. The amplitude of this AC signal has a correlation with the power value of the power signal received by the receiver 20.

The electric wiring which is connected to the output terminal of the AC current sensor 23 branches. Thus, the output AC signal is provided to the low pass filter 201, the band pass filter 202 and the high pass filter 203, respectively. The low pass filter 201 allows the component including the lowest frequency of hopping (frequency band LO) within the AC signal to pass through. The band pass filter 202 allows the component including the center of the frequency band used in frequency hopping (frequency band MID) within the AC signal to pass through. If the number of hopping frequencies is odd, the band pass filter 202 can allow the component including the center frequency of hopping within the AC signal to pass through. The high pass filter 203 allows the component including the maximum frequency of hopping (frequency band HI) within the AC signal to pass through.

The low pass filter 201, the band pass filter 202 and the high pass filter 203 can be designed to ensure that their gains are approximately equal. The measuring circuit 211 measures the power value of the AC signal with frequency band LO, provided from the low pass filter 201. The measuring circuit 212 measures the power value of the AC signal with frequency band MID, provided from the band pass filter 202. The measuring circuit 213 measures the power value of the AC signal with frequency band HI, provided from the high pass filter 203. The power values of the signals provided from the outputs of each filter, measured by the measuring circuits 211 to 213 respectively are correlated to the current values at each frequency band.

The measuring circuits 211 to 213 provide the measured power value to the computation circuit 24. The computation circuit 24 can calculate the frequency characteristics of the power signal based on the power value measured by each measuring circuit. For example, polynomial approximation can be executed by using the steepest descent method. However, the type of approximation equation and the calculation method used are not limited. For example, the computation circuit 24 may include the functions of the above measuring circuits 211 to 213. In this case, the computation circuit 24 which is connected to output terminals of each of the plurality of filters calculates the frequency characteristic of the power signal based on output signals from each of the plurality of filters.

The frequency characteristic calculated by the computation circuit 24 is transmitted to the frequency control circuit 14b of the power transmission device 1 via the communication circuit 25 and the communication circuit 17. The frequency control circuit 14b converts the received frequency characteristic of the power signal to the frequency characteristic of the phase difference of the legs in the inverter 15, using the relation between the current value of the power signal and the phase difference of the legs in the inverter 15. By multiplying the values with coefficients, the current value can be converted to the power value. Thereby, the frequency control circuit 14b can control the phase difference of the legs in the inverter 15, compensating the ripples in the power signal provided to the battery 22.

In the embodiment, the power receiving device 2 includes a plurality of filters each with different passing bands. Thereby, fluctuations of the power signal in different frequencies can be detected. By using a plurality of filters, frequency discrimination for the power signal is possible. Thus, the power receiving device 2 does not necessary have to obtain information regarding the timing of frequency hopping in the supplied power signal.

Fifth Embodiment

For example, if the signal is modulated by the communication device in the transmitting side, the communication device in the receiving side needs to regenerate the timing of the signal for the sake of demodulation. Various methods have been proposed for regenerating the timing of signals. However, in non-contact power transmission systems, the timing of signals does not have to be regenerated unless some data is being transmitted by the supplied power signal. If the power transmission device applies frequency hopping to the supplied power signal, the power receiving device does not necessary have to use information on the timing when the frequencies of the supplied power signal are switched, as mentioned in the fourth embodiment. Thus, power receiving devices which receive power signals using frequency hopping does not necessary have to regenerate the timing of signals.

However, as explained in the fifth embodiment, the power receiving device can regenerate/estimate the timing of frequency hopping for the supplied power signal generated by the power transmission device, for the sake of effective compensation of ripples. In the following, the non-contact power transmission system according to the fifth embodiment is described, mainly focusing on the difference between the fifth embodiment and the fourth embodiment.

Figure 16:
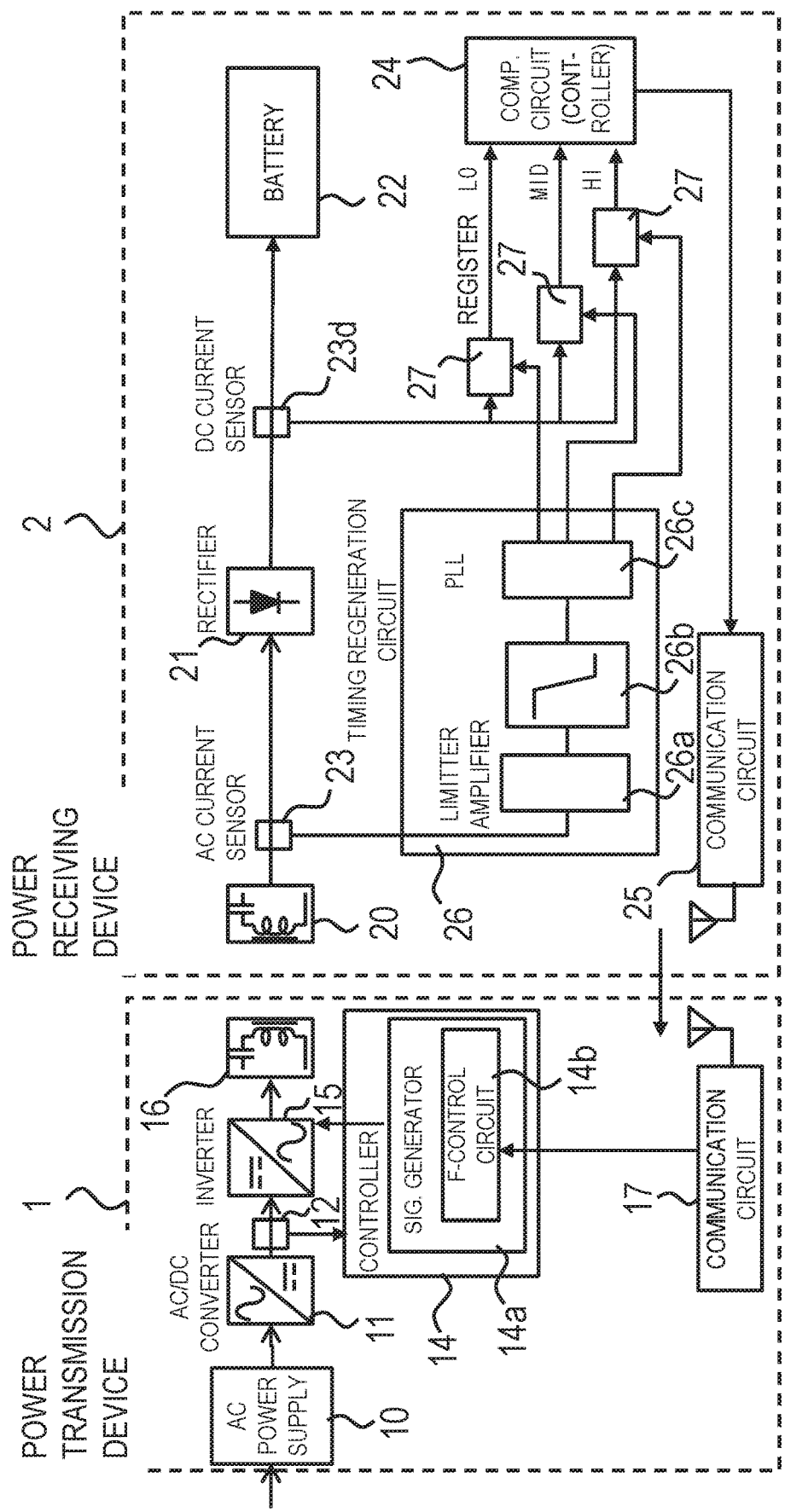
FIG. 16 is a block diagram illustrating a configuration example of a non-contact power transmission system according to a fifth embodiment.

FIG. 16 is a block diagram illustrating a configuration example of a non-contact power transmission system according to a fifth embodiment. The configuration of the power transmission device 1 in FIG. 16 is similar to the power transmission device according to the fourth embodiment (the power transmission device 1 in FIG. 15). The power receiving device 2 in FIG. 16 includes a receiver 20, a rectifier 21, a battery 22, an AC current sensor 23, a DC current sensor 23d, a computation circuit (controller) 24, a communication circuit 25, a timing regeneration circuit 26 and a plurality of registers 27 (Reg2_low_freq, Reg2_mid_freq and Reg_hi_freq). The timing regeneration circuit 26 includes a limiter amplifier 26a, a discriminator 26b and a PLL (Phase Locked Loop) 26c.

The AC current sensor 23 measures the current of the AC power signal received by the receiver 20. The output of the AC current sensor 23 is an AC signal. The amplitude of the AC signal is correlated with the power value of the power signal received by the power receiving device 2. The AC signal is provided to the limiter amplifier 26a. The limiter amplifier 26a provides an AC signal with the amplitude clipped at a certain value. Then, the signal provided from the limiter amplifier 26a enters the input terminal of the discriminator 26b. The discriminator 26b is an element called the frequency discriminator. In the output signal of the discriminator 26b, the changes of the input signal frequency are converted to the changes of voltage values.

If the AC current sensor 23 measures the current of the power signal using frequency hopping, the waveform of the output signal from the discriminator 26b would indicate the frequency hopping pattern. For example, if the triangular shaped transition pattern presented in FIG. 4 is used, the output signal from the discriminator 26b would be equal to the graph of FIG. 4 with the vertical axis replaced to the voltage value. By referring to the output signal of the discriminator 26b, information on the period of the frequency hopping pattern (for example, in FIG. 4 the period of the pattern is 5 milliseconds) can be obtained.

The PLL 26c can execute phase synchronization by using the output signal from the discriminator 26b as the reference signal. Thereby, the timing of the clock corresponding to the period of the frequency hopping pattern (reference timing) can be regenerated. Here, suppose that frequency hopping involving the use of eight frequencies (F0 to F7) is applied to the power signal. For example, the timing when the frequencies F0, F3 and F7 are used can be estimated based on the reference timing. In this case, the timing regeneration circuit 26 provides timing signals SP2_low_freq, SP2_mid_freq and SP2_hi_freq when the frequencies F0, F3 and F7 are used, respectively. Here, the timing signals SP2_low_freq, SP2_mid_freq and SP2_hi_freq each include pulses.

The DC current sensor 23d connected between the rectifier 21 and the battery 22 can measure the current value of the DC power signal. The DC current sensor 23d measures the current value when the timing signal SP2_low_freq rises. The current value measured in this timing is stored in the register Reg2_low_freq. The DC current sensor 23d measures the current value when the timing signal SP2_mid_freq rises. The current value measured in this timing is stored in the register Reg2_mid_freq. Similarly, the DC current sensor 23d measures the current value when the timing signal SP2_hi_freq rises. The DC current sensor 23d can detect the edges of the timing signals. Also, the DC current sensor 23d can detect the levels of the timing signals. Thus, the condition for triggering the DC current signal 23d is not limited.

The computation circuit 24 calculates the phase difference of legs in the inverter 15 by using the current values stored in each register as Iout(f0), Iout(f3) and Iout(f7), respectively, which are current values used in the aforementioned equations. During the calculation process, the frequency characteristic of the current value of the power signal can be estimated by using polynomial approximation methods described in the first to the third embodiment, for example. The frequency characteristic of the current value calculated by the computation circuit 24 can be transmitted to the frequency control circuit 14b via the communication circuit 25 and the communication circuit 17. The frequency control circuit 14b converts the received frequency characteristic of the current value to the frequency characteristic of the phase difference of legs in the inverter 15, by using the relation between the phase difference of legs in the inverter 15 and the current value of the power signal. Then, the frequency control circuit 14b can control the inverter 15 based on the frequency characteristic of the phase difference of legs, reducing the ripple components.

The registers are only an example of elements which can be used for storing the measured values of the sensors. The measured value of the sensors can be saved in other elements such as various volatile memory, various non-volatile memory and various storage devices.

In the embodiment, timing regeneration is executed based on the received power signal. Therefore, the generated timing signal may include jitters with some delays from the actual power signal. The discriminator 26b and the PLL can be designed so that the effects of the above delays are taken into consideration. For example, the time constants can be determined taking the effect of the above delays into consideration. Thereby, the current values can be sampled in the appropriate timings.

In the first embodiment, the current value of the power signal provided from the AC/DC converter 11 of the power transmission device was measured as the data which is correlated to the current value of the power signal provided to the battery 22. However, in the fifth embodiment, the current value of the power signal provided to the battery 22 which is the subject of control, is being measured directly. Despite the fact that the current value measured in the power transmission device 1 is correlated to the current value of the subject of control, the possibility that some errors and delays occur cannot be denied. By directly measuring the current value of the location where reduction of ripple components is required, efficient compensation of ripples is possible, by executing control processes based on the measured data, as described in the fifth embodiment.

Excluding the differences described above, the configuration of the non-contact power transmission system according to the fifth embodiment is similar to the non-contact power transmission system according to the fourth embodiment.

Sixth Embodiment

In methods which execute a plurality of updating processes, such as the steepest descent method, the updating process is repeated until the parameters converge to a certain degree. Therefore, if there is some delay in either of the processing steps, it would take a longer period of time until the values of the parameters converges. For example, in the fifth embodiment, information on the phase difference of legs need to be transmitted from the computation circuit 24 of the power receiving device 2 to the frequency control circuit 14b of the power transmission device 1. Therefore, in the non-contact power transmission system according to the fifth embodiment, the delay in each processing step may become significant. In the discussion above, the parameters correspond to the coefficients $\theta i$ of the equation approximated for the frequency characteristic. In the sixth embodiment, a configuration which accelerates the calculation of the coefficients $\theta i$ of the equation approximated for the frequency characteristic is described. In the following, the non-contact power transmission system according to the sixth embodiment is explained, mainly focusing on the difference from each of the embodiments mentioned above.

Figure 17:
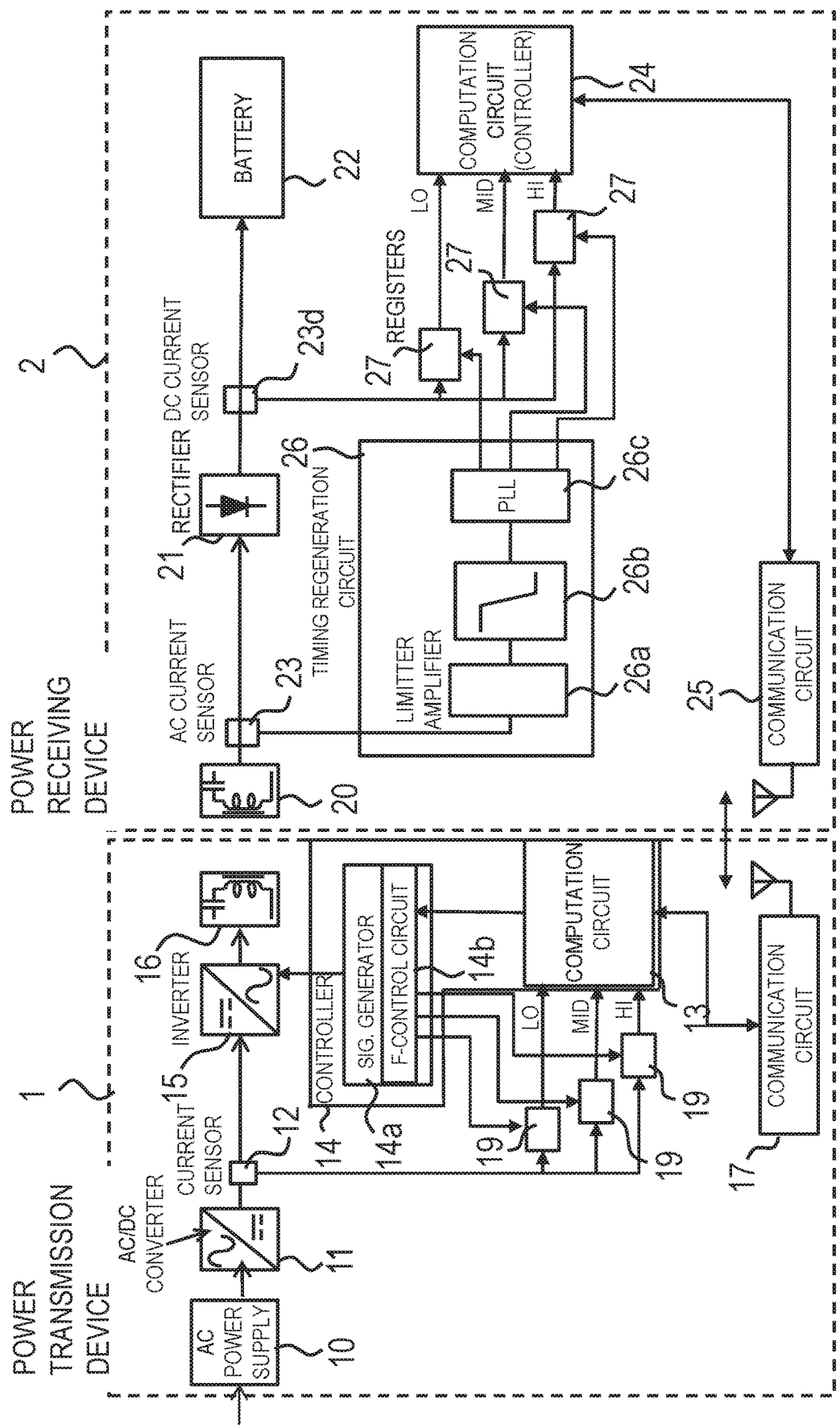
FIG. 17 is a block diagram illustrating a configuration example of a non-contact power transmission system according to a sixth embodiment.

FIG. 17 is a block diagram illustrating a configuration example of a non-contact power transmission system according to a sixth embodiment. The power transmission device 1 in FIG. 17 includes the components of the power transmission device according to the first embodiment (the power transmission device 1 in FIG. 1) and a communication circuit 17. The configuration of the power receiving device 2 in FIG. 17 is similar to the power receiving device according to the fifth embodiment (the power receiving device 2 in FIG. 16). In the non-contact power transmission system according to the sixth embodiment, both the power transmission device 1 and the power receiving device 2 have a computation circuit. During the ripple component reduction process, the computation circuit 13 of the power transmission device 1 and the computation circuit 24 of the power receiving device 2 can be used alternately.

For example, in the beginning of the ripple component reduction process, the coefficients $\theta i$ of the approximated equation for the frequency characteristic are calculated by the computation circuit 13 based on the current value measured by the current sensor 12 of the power transmission device 1, by using the steepest descent method. Since the components involved in the above process is limited to the components within the power transmission device 1, the delay in each processing step can be minimized. Therefore, the coefficients $\theta i$ of the approximated equation for the frequency characteristics could converge within a relative short period of time. Here, the computation circuit 13 monitors the degree of convergence for each of the values of the coefficients $\theta i$. When the values of the coefficients $\theta i$ converge to a certain degree, the computation circuit 13 transmits the values of the coefficients $\theta i$ after the latest update to the computation circuit 24 of the power receiving device 2, via the communication circuit 17 and the communication circuit 25.

The computation circuit 24 updates the received values of the coefficients $\theta i$ based on the current values stored in the plurality of registers 27, by using the steepest descent method. When the values of the coefficients $\theta i$ converge to a certain degree, the phase difference of legs in the inverter 15 is calculated based on the values of the coefficients $\theta i$ after the latest update. Then, the computation circuit 24 transmits the phase difference of the legs to the frequency control circuit 14b in the power transmission device, via the communication circuit 25 and the communication circuit 17. The frequency control circuit 14b controls the inverter 15 using the transmitted phase difference of legs in the inverter 15, thereby reducing the ripple components. Moreover, the computation circuit 24 can transmit the latest updated values of the coefficients $\theta i$ to the power transmission device 1. Then, the power transmission device 1 can calculate the phase difference of legs in the inverter 15 based on the value of the coefficients $\theta i$.

Thus, the power transmission device 1 can execute the coarse adjustment of the coefficients $\theta I$, first. After the values of the coefficients $\theta i$ converge to a certain degree, the power receiving device 2 executes the finer adjustments of the coefficients $\theta i$. Thereby, while shortening the calculation time, efficient compensation of ripples becomes possible. One method for determining whether the values of the coefficients $\theta i$ are converging is by calculating the changing rate of the value with respect to the initial value in each of the iterations. If the changing rate is smaller than the threshold value, it can be determined that the value converged. However, other methods can be used for determining the convergence of values.

Therefore, the computation circuit is implemented in both the power transmission device 1 and the power receiving device 2. The frequency characteristic can be calculated in the computation circuit 13 of the power transmission device 1, first. Then, the frequency characteristic is calculated in the computation circuit 24 of the power receiving device 2.

Also, the coefficients θi can be calculated concurrently by the computation circuit 13 of the power transmission device 1 and the computation circuit 24 of the power receiving device 2. In this case, if the values of the coefficients θi calculated by the computation circuit 13 converge to a certain degree, the computation circuit 13 obtains the values of the latest updated coefficients θi calculated by the computation circuit 24 of the power receiving device 2, via the communication circuit 17 and the communication circuit 25. The computation circuit 13 can execute the finer adjustments of the values of the coefficients θi by using the results calculated by the computation circuit 24 of the power receiving device 2.

Seventh Embodiment

The compensation of ripples can be executed by using the average power of the ripples. In the non-contact power transmission system according to the seventh embodiment, the average power of the ripple components is measured in the power receiving device.

Figure 18:
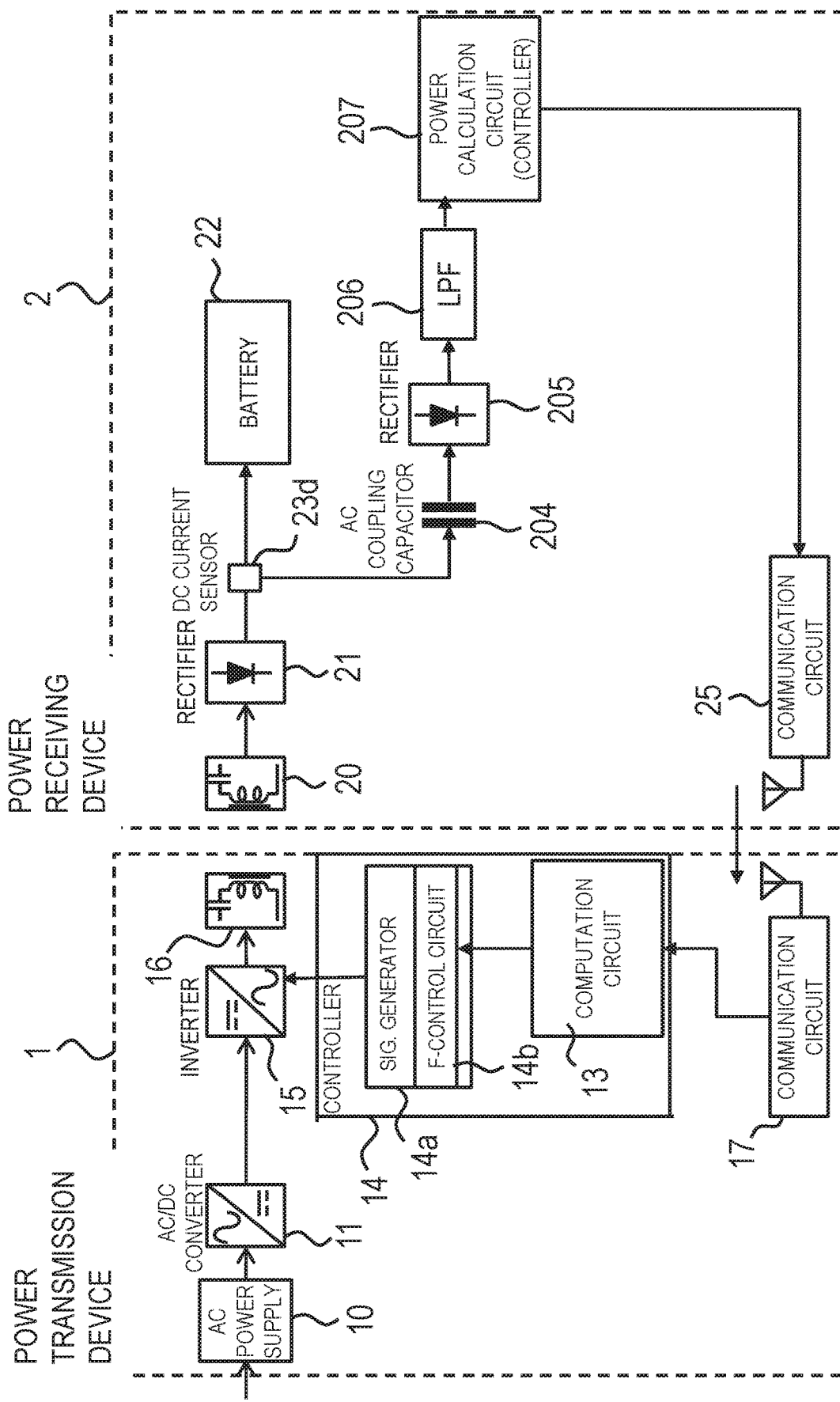
FIG. 18 is a block diagram illustrating a configuration example of a non-contact power transmission system according to a seventh embodiment.

FIG. 18 is a block diagram illustrating a configuration example of a non-contact power transmission system according to a seventh embodiment. The power transmission device 1 in FIG. 18 includes an AC power supply 10, an AC/DC converter 11, a controller 14, an inverter 15, a power transmission device 16 and a communication circuit 17. The controller 14 includes a computation circuit 13, a signal generation circuit 14a and a frequency control circuit 14b as internal components. Also, the power receiving device 2 in FIG. 18 includes a receiver 20, a rectifier 21, a battery 22, a DC current sensor 23d, a communication circuit 25, an AC coupling capacitor 204, a rectifier 205, a low pass filter (LPF) 206 and a power computing circuit 207.

The DC current sensor 23d is connected between the rectifier 21 and the battery 22. The DC current sensor 23d provides a signal with an amplitude which is proportional to the current value measured for the rectified electric signal, from the output. Then, the output signal of the DC current sensor 23d is provided to the input terminal of the AC coupling capacitor 204. The AC coupling capacitor 204 cuts the DC components in the output signal of the DC current sensor 23d. In other words, the output signal from the AC coupling capacitor 204 includes a ripple component which fluctuates both to the positive direction and the negative direction from the voltage level 0V. The fluctuation of the ripple component is related to the frequency switching timing defined by the frequency hopping pattern. The output signal of the AC coupling capacitor 204 is provided to the input terminal of the rectifier 205. The rectifier 205 allows the positive side component of the signal including ripple components to pass through. Then, signal including ripple components of the positive side provided from the output terminal of the rectifier 205 enters the input terminal of the low pass filter 206.

The low pass filter 206 has a time constant which is more than two times greater than the period of the ripples detected by the DC current sensor 23d. By providing the output signal of the rectifier 205 to the low pass filter 206, the amplitude of the ripple components can be averaged. The output signal of the low pass filter 206 is provided to the power computing circuit 207. The power computing circuit 207 calculates the average power value of the signal including the ripple components. The average power value calculated by the power computing circuit 207 is equal to the average value of the power of ripples sampled at a plurality of frequencies. Also, it can be said that the average power value calculated by the power computing circuit 207 corresponds to the sum of the current value measured when each hopping frequency is being used. The power computing circuit 207 transmits the average power value to the computation circuit 13 of the power transmission device 1 via the communication circuit 25 and the communication circuit 17.

The computation circuit 13 can calculate the coefficients in the equation with first degree terms, approximating the frequency characteristic based on the average power value which is included in the received data. Also, the computation circuit 13 can combine the average power value with data measured according to the methods of the aforementioned embodiments and execute polynomial approximation to calculate the coefficients of the approximated equation with second degrees terms or terms of greater degrees. The frequency control circuit 14b can determine the phase difference of legs in the inverter 15 based on the calculated result of the computation circuit 13. Thereby, the reduction of ripple components in the non-contact power transmission system becomes possible.

The above configuration is only an example. Thus, as long as the computation circuit can calculate the frequency characteristic of the power signal based on the average power of ripple components measured during a duration when all of the frequencies are used at least once, configurations different from the example presented in FIG. 18 can be used.

Eighth Embodiment

In the non-contact power transmission system according to the seventh embodiment, the average power of the ripples were calculated based on the current value of the power signal provided to the battery 22, thereby determining the phase difference of legs in the inverter 15. In the non-contact power transmission system according to the eighth embodiment, the maximum value and the minimum value of the current in the power signal provided to the battery 22 is measured.

Figure 19:
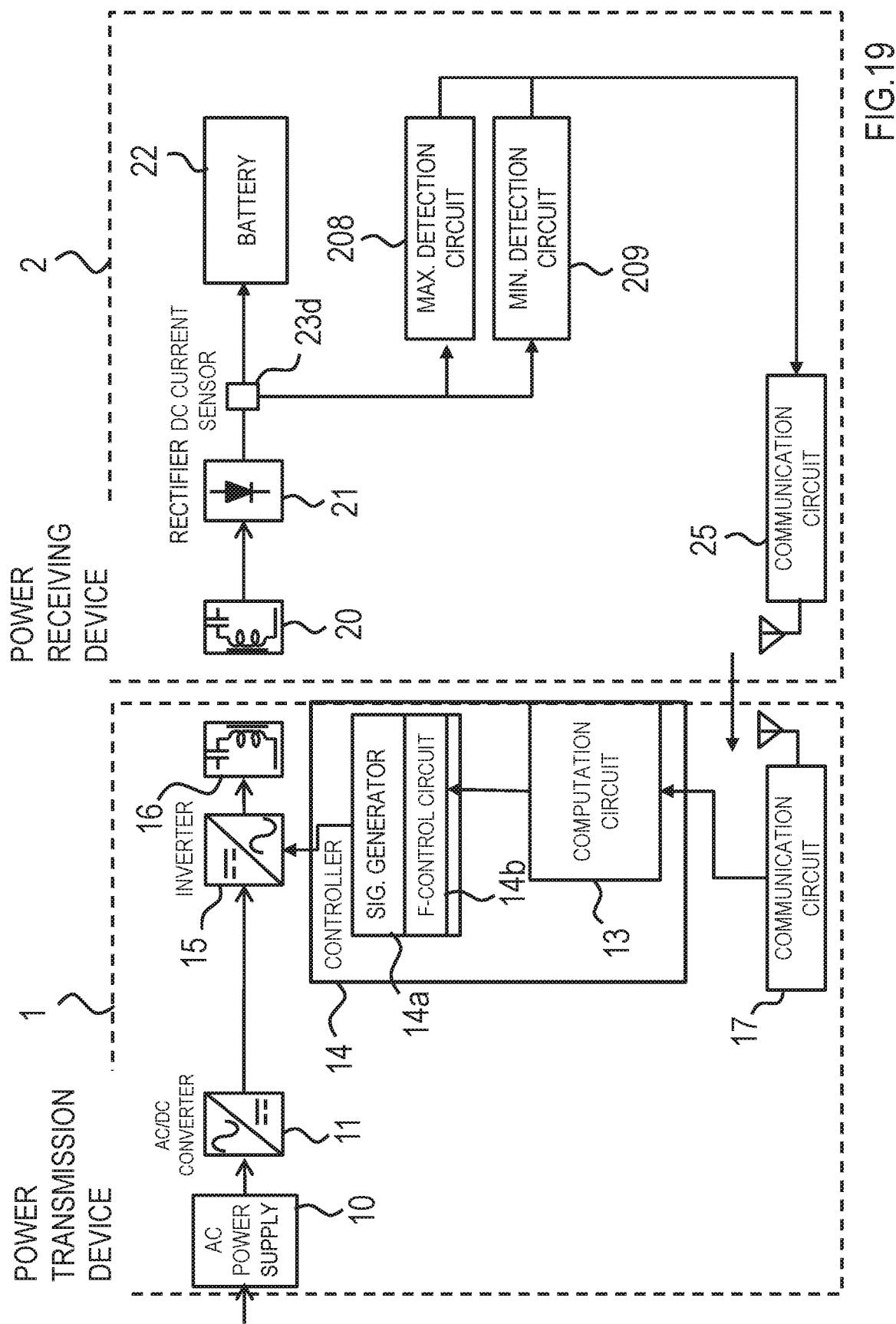
FIG. 19 is a block diagram illustrating a configuration example of a non-contact power transmission system according to an eighth embodiment.

FIG. 19 is a block diagram illustrating a configuration example of a non-contact power transmission system according to an eighth embodiment. The configuration of the power transmission device 1 in FIG. 19 is similar to the power transmission device according to the seventh embodiment (the power transmission device 1 in FIG. 18). The power receiving device 2 in FIG. 19 includes a receiver 20, a rectifier 21, a battery 22, a DC current sensor 23d, a communication circuit 25, a maximum detection circuit 208 and a minimum detection circuit 209.

The DC current sensor 23d measures the current value of the power signal provided to the battery 22. The DC current sensor 23d transmits the information of the measured current value to the maximum detection circuit 208 and the minimum detection circuit 209. The maximum detection circuit 208 and the minimum detection circuit 209 monitors the current value for a duration when all the frequencies (for example, frequencies F0 to F7) are used at least once during the frequency hopping pattern of the supplied power signal. The maximum detection circuit 208 stores the maximum value of current $i_{max}$ during the corresponding duration. The minimum detection circuit 209 stores the minimum value of current $i_{min}$ during the corresponding duration.

Thus, the sensor measures the power signal which is a DC signal for a duration when all of the frequencies in the pattern are used at least once. The computation circuit (controller) calculates the frequency characteristic of the power signal based on a maximum value and a minimum value measured during the duration.

It is difficult to specify the frequency used in the supplied power signal when the maximum value of current $i_{max}$ and the minimum value of current $i_{min}$ have been measured. However, it is evident that the current $i_{max}$ and the current $i_{min}$ have been measured when different frequencies have been used. Thus, the current values $i_{max}$ and $i_{min}$ can be used as the current value Iout( . . . ) sampled when a plurality of frequencies have been used.

The current values $i_{max}$ and $i_{min}$ measured in the power receiving device 2 are transmitted to the computation circuit 13 of the power transmission device 1. The computation circuit 13 can execute polynomial approximation to calculate the coefficients of the equation with first degree terms, approximating the frequency characteristic based on the received current values $i_{max}$ and $i_{min}$. Also, the computation circuit 13 can combine the current values $i_{max}$ and $i_{min}$ with the data measured according to the methods of the aforementioned embodiments and execute polynomial approximation to calculate the coefficients of the equation with second degrees terms or terms of greater degrees. Based on the calculated result of the computation circuit 13, the frequency control circuit 14b can determine the phase difference of legs in the inverter 15. Thereby, the ripple components can be reduced in the non-contact power transmission system.

In the non-contact power transmission system according to the seventh embodiment and the eighth embodiment, the current value of the power signal in the power receiving device 2 was measured. However, since the current value of the power signal in the power transmission device 1 is correlated with the current value of the power signal in the power receiving device 2, it is possible to measure the current value of the power signal in the power transmission device 1 to reduce the ripple components according to the methods described in the seventh embodiment and the eighth embodiment. Also, values other than the current such as the voltage or the power of the power signal can be measured.

Figure 20:
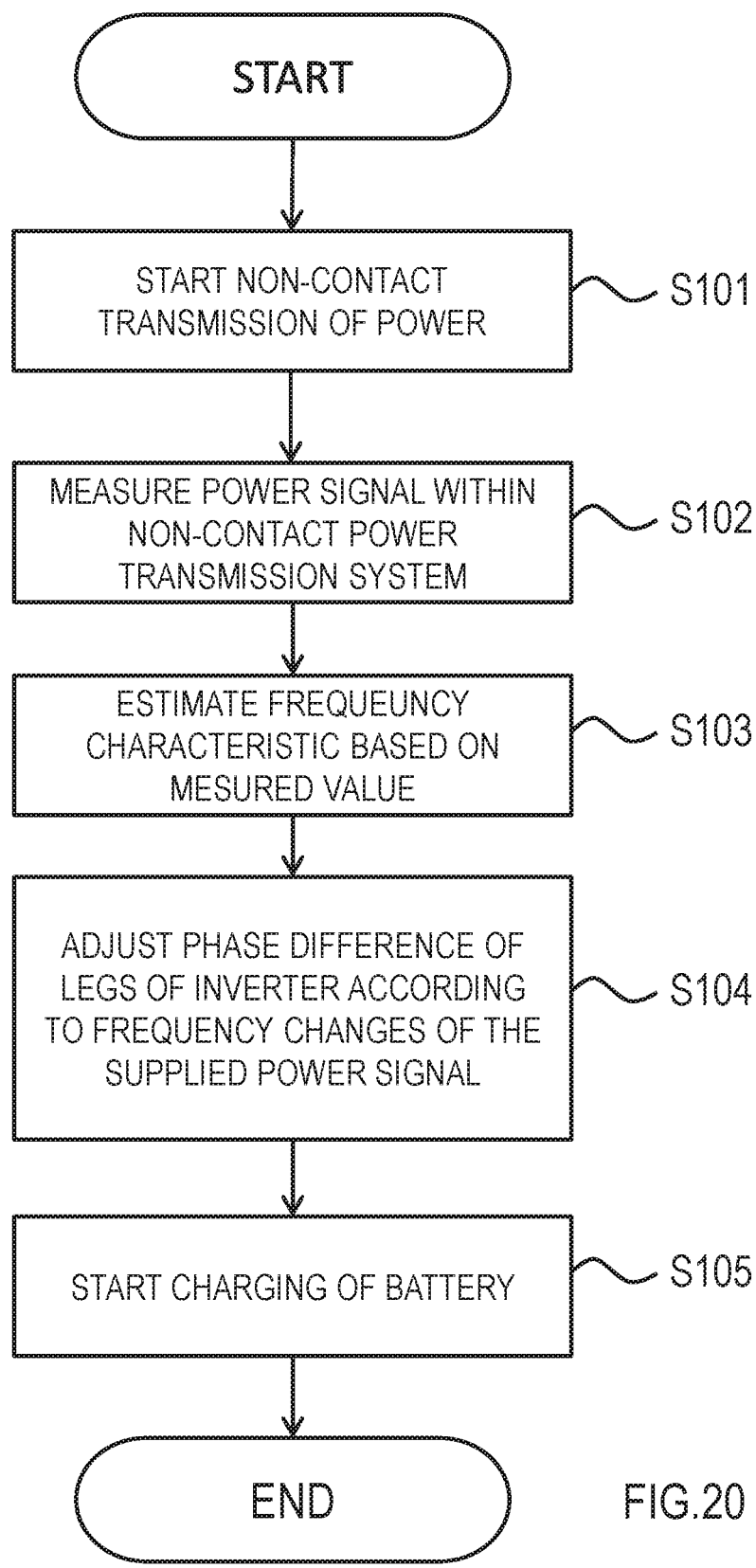
FIG. 20 is a flowchart presenting an example of process executed by the non-contact power transmission system.

In above, mainly the configuration examples of the non-contact power transmission system were described. In the following, the overall processing flow executed by the non-contact power transmission system is described. FIG. 20 is a flowchart presenting an example of process executed by the non-contact power transmission system. Below, the process is explained with reference to FIG. 20.

First, the non-contact power transmission system starts non-contact transmission of power (step S101). Thereby, the power transmission device 1 generates the supplied power signal. Then, the power receiving device 2 receives the supplied power signal. Since frequency hopping is applied to the supplied power signal, the frequency of the power signal changes depending on the timing. Since the power signal starts to flow within the non-contact power transmission system, measurement of the power signal becomes possible. In step S101, there is a possibility that the power signal includes some ripple components. In order to minimize the impact to the battery 22, the AC/DC converter 11 can set the power of the power signal to relatively smaller values.

Next, the power signal within the non-contact power transmission system is measured (step S102). As mentioned above, the power signal in the power transmission device 1 can be measured. Also, the power signal in the power receiving device 2 can be measured. The power signal in both the power transmission device 1 and the power receiving device 2 can be measured as well. Thus, the location where the power signal is measured is not limited. Also, the timing of measurement is not limited. In non-contact power transmission systems where a constant voltage is used, such as the non-contact power transmission system according to the first embodiment, the current value of the power signal can be measured. Also, the voltage value or the power value can be measured. Thus, the power signal can be measured by using any type of method.

Then, based on the measured value of the power signal, the frequency characteristic are estimated (step S103). Specifically, the frequency characteristic of the phase difference in legs of the inverter 15 are estimated in step S103. In each of the aforementioned embodiments, the current value of the power signal (specifically, the power signal supplied to the transmitter 16) was controlled by an inverter circuit where the phase difference of the legs were controllable. However, this is only an example. Therefore, if the amplitude of the power signal can be controlled by using different types of adjustment circuits, the setting values can be values other than the phase difference of legs in the inverter 15. In such cases, the frequency characteristic for the setting values of the adjustment circuit can be estimated in step S103. Examples of methods which can be used for estimating the frequency characteristics include polynomial approximation by steepest descent method. However, any other method can be used for estimating the frequency characteristics.

In step S102 and step S103, the relation between the setting value of the adjustment circuit and the measured value of the power signal can be calculated. For example, in the first embodiment, if the phase difference of legs in the inverter 15 is increased, the current value of the power signal also increased (FIG. 9). Using the calculated relation between the setting value of the adjustment circuit and the measured value of the power signal, the setting value of the adjustment circuit can be controlled, changing the current value or the voltage value of the power signal.

Next, the phase difference of legs (setting values) in the inverter 15 is adjusted according to the frequency changes of the supplied power signal (step S104). For example, suppose that in the process of step S103, a frequency characteristic with a curve indicating that "if the frequency of the power signal is increased, the corresponding setting value is decreases" is obtained from the calculation process. In this case, if the frequency of the supplied power signal is switched to a higher value, the phase difference of legs in the inverter 15 can be adjusted to a greater value. Therefore, in response to switching of the frequency, the setting value (for example, the phase difference of legs in the inverter 15) of the adjustment circuit is adjusted to ensure that fluctuations in the power signal due to the frequency characteristic of the circuit are reduced. Thereby, the fluctuations in the power signal due to the frequency characteristics of the circuits are reduced, reducing the ripple components.

Since the controlling process which reduces the fluctuations in the power signal is executed from the previous step, it is possible to charge the battery 22 by providing the power signal (step S105). For example, the AC/DC converter 11 can set the power value of the power signal to a relatively smaller value in the aforementioned steps S101 to S104. When the calculation converges and the control process which reduces the fluctuations (ripple components) in the power signal is executed stably, the AC/DC converter 11 can increase the power value of the power signal to ensure that sufficient amount of power is provided to the battery 22.

By executing frequency hopping, the strength of leakage electromagnetic fields can be reduced for each frequency.

Also, by executing the control processes described above, the ripple components can be reduced by simple controlling processes, without the use of large scale circuits.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the devices mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An apparatus comprising:
a transmitter which transmits a power signal wirelessly;
a controller which switches a frequency of the power signal;
a sensor which measures a fluctuation of the power signal, wherein the controller estimates a frequency characteristic of the power signal based on the fluctuation measured by the sensor; and
an adjustment circuit which adjusts an amplitude of the power signal based on a change of the frequency characteristic of the power signal caused by the switching of the frequency of the power signal,
wherein the controller estimates the frequency characteristic based on polynomial approximation and steepest descent method, and
wherein the controller calculates a first degree term coefficient of the frequency characteristic based on a value measured at a first frequency and a value measured at a second frequency, and calculates a second degree term coefficient of the frequency characteristic based on at least a value measured at a third frequency.

2. The apparatus according to claim 1, wherein:
the adjustment circuit comprises an inverter which converts power, and
the inverter adjusts a phase difference of legs, based on the frequency characteristic, to reduce a ripple of the power signal caused by the switching of the frequency of the power signal.

3. The apparatus according to claim 1, wherein the adjustment circuit adjusts the amplitude of the power signal to cancel the change of the frequency characteristic of the power signal caused by the switching of the frequency of the power signal.

4. The apparatus according to claim 1, wherein the sensor measures the power signal at a plurality of timings at each of which the frequency of the power signal is different.

5. A system comprising:
a power transmission device comprising:
a controller which switches a frequency of a power signal between a plurality of frequencies; and
a power transmission circuit which transmits the power signal wirelessly;
a power receiving device which charges a battery by the power signal received from the power transmission device;
a sensor which measures a fluctuation of the power signal in accordance with the switching of the frequency of the power signal, wherein the controller estimates a frequency characteristic of the power signal based on the fluctuation measured by the sensor; and
an adjustment circuit which adjusts an amplitude of the power signal based on a change of the frequency characteristic of the power signal caused by the switching of the frequency of the power signal,
wherein the controller estimates the frequency characteristic based on polynomial approximation and steepest descent method, and
wherein the controller calculates a first degree term coefficient of the frequency characteristic based on a value measured at a first frequency and a value measured at a second frequency, and calculates a second degree term coefficient of the frequency characteristic based on at least a value measured at a third frequency.

6. The system according to claim 5, wherein:
the power transmission device further comprises an inverter which converts power, and
the inverter adjusts a phase difference of legs, based on the frequency characteristic, to reduce a ripple of the power signal caused by the switching of the frequency of the power signal.

7. The system according to claim 5, wherein the adjustment circuit adjusts the amplitude of the power signal to cancel the change of the frequency characteristic of the power signal caused by the switching of the frequency of the power signal.

8. The system according to claim 5, wherein the sensor measures the power signal provided to the battery in the power receiving device.

9. The system according to claim 5, wherein the sensor measures the power signal at a plurality of timings at each of which the frequency used is different.

10. A system comprising:
a power transmission device comprising:
a controller which switches a frequency of a power signal between a plurality of frequencies; and
a power transmission circuit which transmits the power signal wirelessly, a power receiving device which charges a battery by the power signal received from the power transmission device;

a sensor which measures a fluctuation of the power signal in accordance with the switching of the frequency of the power signal, wherein the controller estimates a frequency characteristic of the power signal based on the fluctuation measured by the sensor; and an adjustment circuit which adjusts an amplitude of the power signal based on a change of the frequency characteristic of the power signal caused by the switching of the frequency of the power signal, wherein the power receiving device measures the power signal, which is an AC signal, by using the sensor, an output terminal of the sensor is connected to a plurality of filters each with different passing bands, the controller is connected to output terminals of each of the plurality of filters, and the controller estimates the frequency characteristic of the power signal based on output signals from the output terminals of each of the plurality of filters.

11. A system comprising:

a power transmission device comprising:
- a controller which switches a frequency of a power signal between a plurality of frequencies, and
- a power transmission circuit which transmits the power signal wirelessly, a power receiving device which charges a battery by the power signal received from the power transmission device, a sensor which measures a fluctuation of the power signal in accordance with the switching of the frequency of the power signal, wherein the controller estimates a frequency characteristic of the power signal based on the fluctuation measured by the sensor; and an adjustment circuit which adjusts an amplitude of the power signal based on a change of the frequency characteristic of the power signal caused by the switching of the frequency of the power signal, wherein the power receiving device regenerates a timing of frequency switching in the power signal by the power transmission device, and the sensor measures the power signal based on the timing of frequency switching regenerated by the power receiving device.

12. The system according to claim 11, wherein:

the controller comprises a first controller implemented in the power transmission device and a second controller implemented in the power receiving device, and the first controller in the power transmission device calculates the frequency characteristic before the second controller in the power receiving device calculates the frequency characteristic.

13. A system comprising:

a power transmission device configured to:
- a controller which switches a frequency of a power signal between a plurality of frequencies, and
- a power transmission circuit which transmits the power signal wirelessly, a power receiving device which charges a battery by the power signal received from the power transmission device, a sensor which measures a fluctuation of the power signal in accordance with the switching of the frequency of the power signal, wherein the controller estimates a frequency characteristic of the power signal based on the fluctuation measured by the sensor; and an adjustment circuit which adjusts an amplitude of the power signal based on a change of the frequency characteristic of the power signal caused by the switching of the frequency of the power signal, wherein the sensor measures the power signal, which is a DC signal, for a duration in which all of the frequencies are used at least once, and the controller calculates the frequency characteristic of the power signal based on a maximum value and a minimum value measured during the duration.

14. The system according to claim 5, wherein the controller calculates the frequency characteristic of the power signal based on an average power of ripple components measured during a duration in which all of the frequencies are used at least once.

15. A method comprising:

transmitting a power signal between a power transmission device and a power receiving device wirelessly;

switching a frequency of the power signal;

measuring a fluctuation of the power signal in accordance with the switching of the frequency of the power signal;

estimating a frequency characteristic of the power signal based on the fluctuation; and adjusting an amplitude of the power signal based on a change of the frequency characteristic of the power signal caused by the switching of the frequency of the power signal, wherein the estimating the frequency characteristic is based on polynomial approximation and steepest descent method, and wherein the estimating the frequency characteristic comprises: calculating a first degree term coefficient of the frequency characteristic based on a value measured at a first frequency and a value measured at a second frequency, and calculating a second degree term coefficient of the frequency characteristic based on at least a value measured at a third frequency.

16. The method according to claim 15, further comprising:

adjusting a phase difference of legs in an inverter which converts power, based on the frequency characteristic, to reduce a ripple of the power signal caused by the switching of the frequency of the power signal.

* * * * *